United States Patent
Hiroki

(10) Patent No.: US 10,762,078 B2
(45) Date of Patent: Sep. 1, 2020

(54) PREDICTION DATA GENERATION DEVICE AND VEHICLE CONTROL DEVICE

(71) Applicant: TOYOTA JIDOSHA KABUSHIKI KAISHA, Toyota-shi, Aichi-ken (JP)

(72) Inventor: Daisuke Hiroki, Toda (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 336 days.

(21) Appl. No.: 15/807,048

(22) Filed: Nov. 8, 2017

(65) Prior Publication Data

US 2018/0157701 A1    Jun. 7, 2018

(30) Foreign Application Priority Data

Dec. 2, 2016    (JP) .................................. 2016-234922

(51) Int. Cl.
*G06F 17/00*    (2019.01)
*B60R 16/023*   (2006.01)
(Continued)

(52) U.S. Cl.
CPC ........ *G06F 16/2379* (2019.01); *B60R 16/023* (2013.01); *G06F 16/9024* (2019.01);
(Continued)

(58) Field of Classification Search
CPC ... G06F 16/2379; G06F 16/9024; G07C 5/08; G07C 5/085; G07C 5/008; G07C 5/02; B60R 16/023; B60W 2050/0014; B60W 2050/0095; B60W 2050/0089; B60W 2050/0026; B60W 50/06; B60W 50/0097; H04L 67/12

See application file for complete search history.

(56) References Cited

U.S. PATENT DOCUMENTS

2004/0088392 A1* 5/2004 Barrett ................... G01C 21/26
                                                       709/223
2007/0273492 A1   11/2007 Hara et al.
(Continued)

FOREIGN PATENT DOCUMENTS

JP    2000011266 A    1/2000
JP    2007230422 A    9/2007
(Continued)

*Primary Examiner* — Nga X Nguyen
(74) *Attorney, Agent, or Firm* — Hunton Andrews Kurth LLP

(57) ABSTRACT

A prediction data generation device includes a storage device and a processor, and generates prediction data in which a node of a directed graph is defined and a link of the directed graph is defined by a transition of the node. The prediction data is used as an input of a transition prediction process predicting a transition of the node. The processor is configured to execute a storage update process updating the prediction data in order and storing the updated prediction data in the storage device in accordance with an update of the data group along with elapse of time. The storage update process includes at least one of a process of increasing the number of observations of the node when a node per category is previously known, or a process of increasing the number of observations of the link when a link per category is previously known.

7 Claims, 15 Drawing Sheets

(51) Int. Cl.
*G06F 16/23* (2019.01)
*G06F 16/901* (2019.01)
*G07C 5/08* (2006.01)
*G07C 5/00* (2006.01)

(52) U.S. Cl.
CPC .............. *G07C 5/08* (2013.01); *G07C 5/085* (2013.01); *G07C 5/008* (2013.01)

(56) References Cited

U.S. PATENT DOCUMENTS

2012/0016581 A1* 1/2012 Mochizuki ............. G08G 1/161
701/301
2016/0225201 A1 8/2016 Hiroki

FOREIGN PATENT DOCUMENTS

| JP | 2008293348 A | 12/2008 |
| JP | 5867296 B2 | 2/2016 |
| JP | 2016-095707 A | 5/2016 |
| JP | 2016-141271 A | 8/2016 |

* cited by examiner

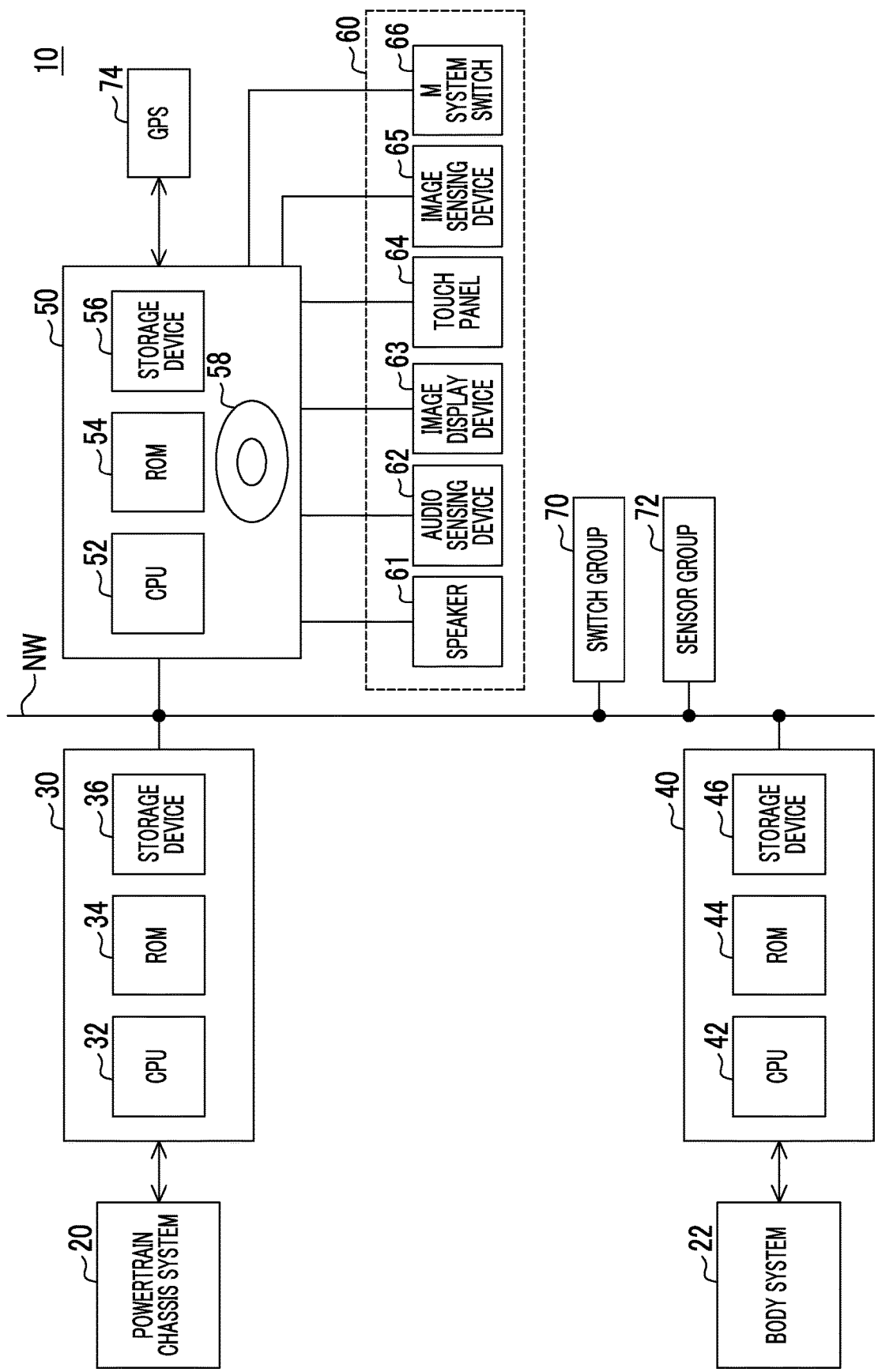

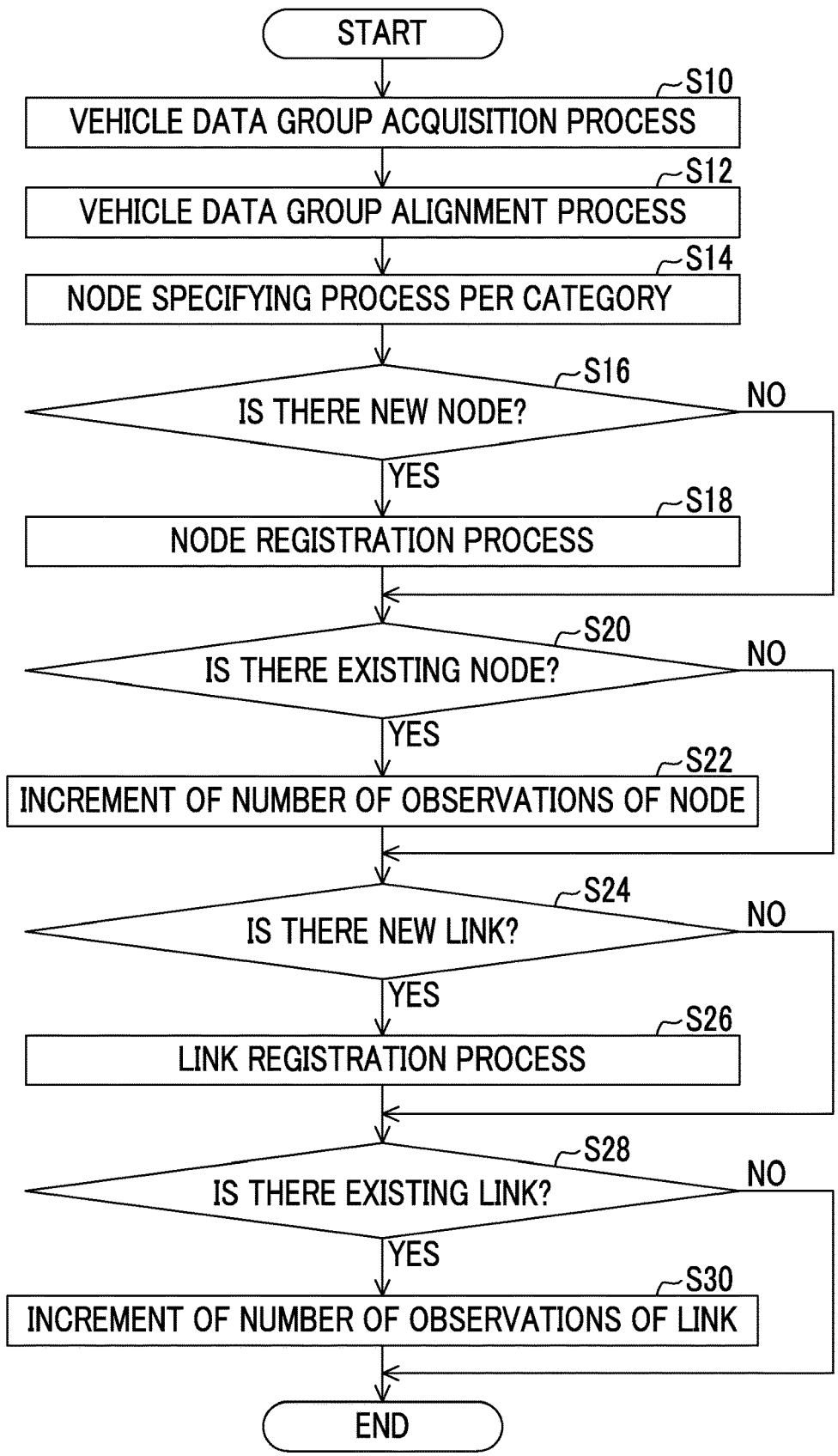

FIG. 3

| TIME | VEHICLE DATA GROUP | | | | | | | |
|------|-----|-----|-----|-----|-----|-----|-----|-----|
|      | A1  | A2  | A3  | A4  | A5  | A6  | ... | An  |
| T1   | a11 | a12 | a13 | a14 | a15 | a16 | ... | a1n |
| T2   | a21 | a22 | a23 | a24 | a25 | a26 | ... | a2n |
| ...  | ... | ... | ... | ... | ... | ... | ... | ... |
| Tm   | am1 | am2 | am3 | am4 | am5 | am6 | ... | amn |

FIG. 4

NODE LIST OF CATEGORY X

| VEHICLE DATA SUBGROUP X | | | SIGN | NUMBER OF OBSERVATIONS |
|-----|-----|-----|------|------------------------|
| A1  | A2  | A3  |      |                        |
| a11 | a12 | a13 | 1    | 10                     |
| a21 | a22 | a23 | 2    | 1                      |
| ... | ... | ... | ...  | ...                    |
| am1 | am2 | am3 | x    | P                      |

NODE LIST OF CATEGORY Y

| VEHICLE DATA SUBGROUP Y | | | | SIGN | NUMBER OF OBSERVATIONS |
|-----|-----|-----|-----|------|------------------------|
| A3  | A4  | A5  | A6  |      |                        |
| a13 | a14 | a15 | a16 | 1    | 9                      |
| a23 | a24 | a25 | a26 | 2    | 2                      |
| ... | ... | ... | ... | ...  | ...                    |
| am3 | am4 | am5 | am6 | y    | Q                      |

NODE LIST OF CATEGORY Z

| VEHICLE DATA SUBGROUP Z | | | | SIGN | NUMBER OF OBSERVATIONS |
|-----|-----|-----|-----|------|------------------------|
| A2  | A4  | A6  | An  |      |                        |
| a12 | a14 | a16 | a1n | 1    | 20                     |
| a22 | a24 | a26 | a2n | 2    | 9                      |
| ... | ... | ... | ... | ...  | ...                    |
| am2 | am4 | am6 | amn | z    | R                      |

FIG. 5

LINK LIST OF CATEGORY X

| LINK ID | START POINT NODE ID | END POINT NODE ID | CUMULATIVE NUMBER OF OBSERVATIONS |
|---|---|---|---|
| 1 | Nx1 | Nx2 | p |
| ... | ... | ... | ... |
| Nx | Nxi | Nxj | q |

LINK LIST OF CATEGORY Y

| LINK ID | START POINT NODE ID | END POINT NODE ID | CUMULATIVE NUMBER OF OBSERVATIONS |
|---|---|---|---|
| 1 | Ny1 | Ny2 | r |
| ... | ... | ... | ... |
| Ny | Nyi | Nyj | s |

LINK LIST OF CATEGORY Z

| LINK ID | START POINT NODE ID | END POINT NODE ID | CUMULATIVE NUMBER OF OBSERVATIONS |
|---|---|---|---|
| 1 | Nz1 | Nz2 | d |
| ... | ... | ... | ... |
| NzY | Nzi | Nzj | e |

FIG. 12

INTER-CATEGORY NODE LIST

| CATEGORY X | CATEGORY Y | CATEGORY Z | ... | SIGN | NUMBER OF OBSERVATIONS |
|---|---|---|---|---|---|
| 1 | 2 | 1 | ... | (1, 2, 1, ...) | 3 |
| 1 | 3 | 2 | ... | (1, 3, 2, ...) | 2 |
| ... | ... | ... | ... | ... | ... |
| x | y | z | ... | (x, y, z, ...) | S |

INTER-CATEGORY LINK LIST

| LINK ID | START POINT NODE ID | END POINT NODE ID | NUMBER OF OBSERVATIONS |
|---|---|---|---|
| 1 | (1, 2, 1, ...) | (x, 3, 2, ...) | 3 |
| ... | ... | ... | ... |
| N | (1, 3, 2, ...) | (x, y, z, ...) | T |

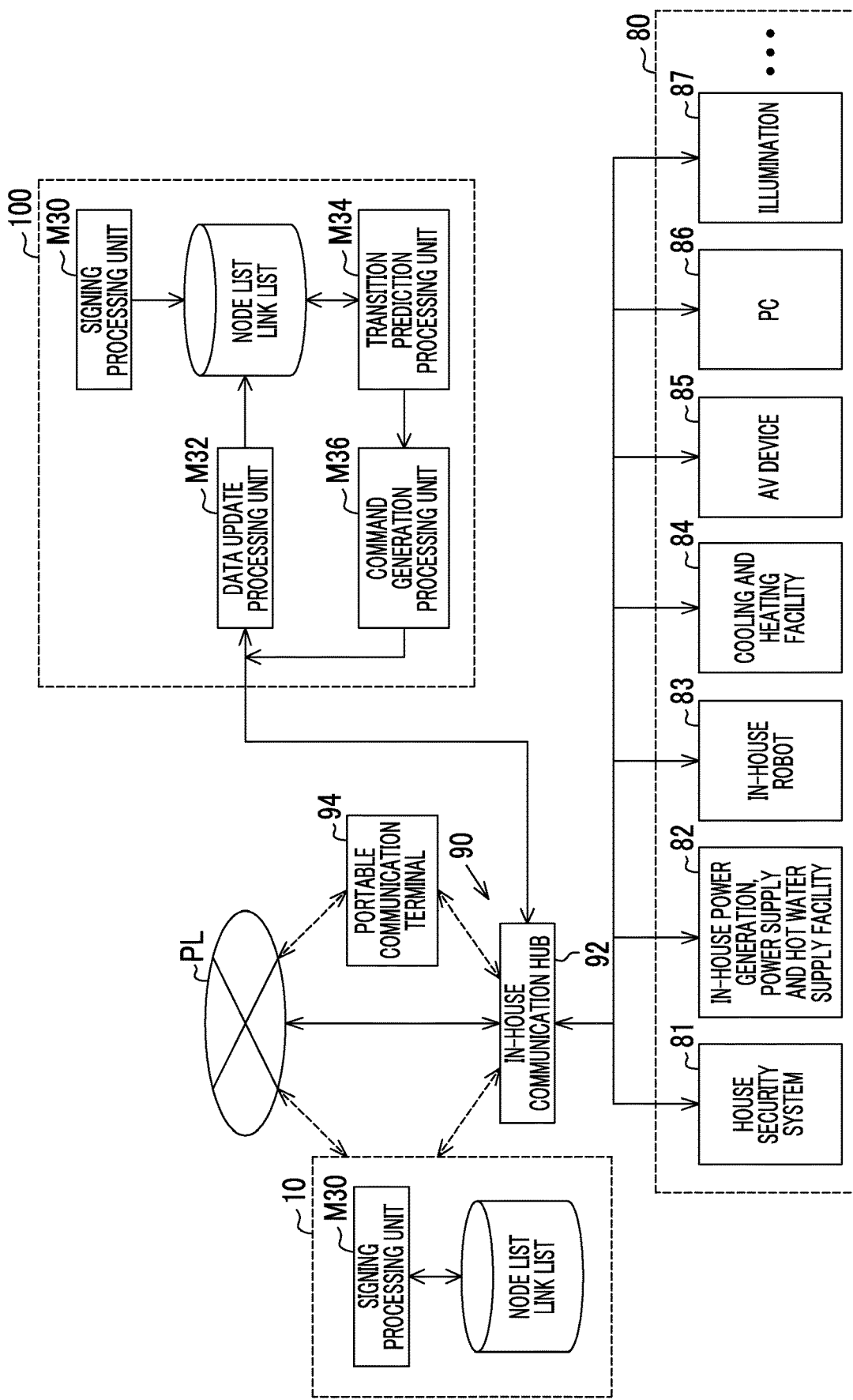

FIG. 15A

| FIXED NODE ID | VEHICLE DATA SUBGROUP | | |
|---|---|---|---|
| | A1 | ... | Am |
| Sn1 | a11 | ... | a1L |
| ... | ... | ... | ... |
| Snn | aN1 | ... | aNL |

FIG. 15B

| LINK (RULE) ID | START POINT NODE ID | ISSUED COMMAND PARAMETER |
|---|---|---|
| R1 | Sn1 | a |
| ... | ... | ... |
| Rx | Snx | x |

FIG. 15C

| FIXED NODE ID | GENERATED NODE ID1 | ... | GENERATED NODE IDx |
|---|---|---|---|
| Sn1 | N1 | ... | N2 |
| ... | ... | ... | ... |
| Snn | Ni | ... | Nj |

PREDICTION DATA GENERATION DEVICE AND VEHICLE CONTROL DEVICE

INCORPORATION BY REFERENCE

The disclosure of Japanese Patent Application No. 2016-234922 filed on Dec. 2, 2016 including the specification, drawings and abstract is incorporated herein by reference in its entirety.

BACKGROUND

1. Technical Field

The disclosure relates to a prediction data generation device that generates prediction data including a directed graph, and a vehicle control device that uses the prediction data.

2. Description of Related Art

A transition prediction system that uses a directed graph to predict a transition of a vehicle state is disclosed in, for example, Japanese Unexamined Patent Application Publication No. 2016-141271 (JP 2016-141271 A). The directed graph is data having a node defined based on a vehicle data group acquired at the same time in time-series data and having a link defined by a transition of the node. The time-series data is generated by acquiring, in order, the vehicle data group that includes a plurality of types of data including data related to devices in a vehicle. The system stores the node and the number of observations of the node and stores the link and the number of observations of the link. A transition of the vehicle state is predicted as a transition of the node by considering a node having a relatively large number of observations as having a higher probability of occurrence than a node having a relatively small number of observations.

SUMMARY

In the system, the number of new nodes that may be registered is increased as the number of pieces of vehicle data defining a node is increased. As the number of nodes that may be registered is increased, a long period of time is taken before a certain large number of observations of a node or a link are achieved. A certain large number of observations is desired in order to secure accuracy in a node transition prediction process. Thus, in the system, the period of time before prediction having a certain level of accuracy is performed may be increased.

The present disclosure provides a prediction data generation device that can increase, earlier than usual, the number of observations of at least one of a node and a link in prediction data including a directed graph, and a vehicle control device that uses the prediction data.

A first aspect of the present disclosure relates to a prediction data generation device that includes a storage device and a processor, and generates prediction data in which a node of a directed graph is defined based on data groups acquired at the same time among data groups and in which a link of the directed graph is defined by a transition of the node. Each data group includes a plurality of types of data including data related to a device in a vehicle. The prediction data is used as an input of a transition prediction process that predicts a transition of the node. The processor is configured to define, for each of a predetermined plurality of categories, a node per category as the node of the directed graph by a data subgroup of the data group, the data subgroup including a plurality of types of data belonging to the category, define a link per category as the link of the directed graph by a transition from one of a pair of different nodes to another, use the node per category, the link per category, and at least one of the number of observations of the node per category and the number of observations of the link per category as the prediction data, and execute a storage update process that updates the prediction data in order and stores the updated prediction data in the storage device in accordance with an update of the data group along with elapse of time. The storage update process includes at least one of a process of increasing the number of observations of the node on a condition that the node per category is previously known, and a process of increasing the number of observations of the link on a condition that the link per category is previously known.

The first aspect of the present disclosure defines the node per category by a part of the data group. The processor stores the node per category, the link per category, and at least one of the number of observations of the node and the number of observations of the link as the prediction data in the storage device. The maximum number of combinations that the node may have and the maximum number of combinations that the link may have in each category constituting the prediction data are smaller than when one node is defined by all pieces of data belonging to each category. Thus, when the processor updates the prediction data in accordance with an update of the data group, the number of observations stored in the storage device is more likely to be increased earlier than usual than when one node is defined by all pieces of data belonging to each category.

In the prediction data generation device according to the first aspect of the present disclosure, the storage update process executed by the processor may include a data group acquisition process that acquires the data group in order, a specification process that specifies the node per category by classifying the data group acquired in order into the categories, a node registration process that stores the node specified by the specification process as a new node in the storage device on a condition that the specified node is not yet stored in the storage device, a link registration process that stores a transition to the node per category specified by the specification process as a new link in the storage device on a condition that the transition is not yet stored in the storage device, and at least one of a process of increasing the number of observations of the node on a condition that the node specified by the specification process is already stored in the storage device, and a process of increasing the number of observations of the link on a condition that a transition to the specified node from an immediately previous node is already stored in the storage device.

In the prediction data generation device according to the first aspect of the present disclosure, the data group may further include a plurality of types of data in a house. The first aspect of the present disclosure handles not only the data group related to the vehicle (vehicle data group) but also the data group related to the house (house data group). Thus, when the node is defined by the vehicle data group and the house data group, the maximum number of combinations that the node may have is increased further than when the house data group is not included. Thus, an advantage of defining the node per category is particularly significant for increasing the number of observations of the node or the number of observations of the link earlier.

While each category may be defined by the vehicle data group or the house data group, a category that includes a node defined by both of the vehicle data group and the house data group is desired.

In the prediction data generation device according to the first aspect of the present disclosure, the vehicle may include a first controller and a second controller. The categories may include a first category that is formed by the data subgroup handled by the first controller, and a second category that is formed by the data subgroup handled by the second controller and is different from the first category.

The first aspect of the present disclosure enables easy categorization because each of the data subgroups respectively handled by the first controller and the second controller constitutes a single category.

In the prediction data generation device according to the first aspect of the present disclosure, the storage update process may be configured to define an inter-category node different from the node per category as the node of the directed graph by a combination of nodes of each of the categories, define an inter-category link different from the link per category as the link of the directed graph by a transition from one of a pair of different inter-category nodes to another, and include the inter-category node, the inter-category link, and at least one of the number of observations of the inter-category node and the number of observations of the inter-category link in the prediction data that is stored in the storage device and updated in order.

According to the first aspect of the present disclosure, when data that belongs to one category has a correlation with data that belongs to another category and not to the one category, prediction based on the correlation may not be performed when the prediction data is configured with the node per category and the link per category. Such a case can be prevented by designing the categories. However, when all pieces of data having a useful correlation are designed to be included in the same category, the designing step may be complicated. Therefore, the first aspect of the present disclosure defines the inter-category node and the inter-category link that are different from the node per category and the link per category, and includes the inter-category node and the inter-category link in the prediction data. Accordingly, while the rate of increase in the number of observations of the inter-category node or the inter-category link is lower than the rate of increase in the number of observations of the node per category or the link per category, prediction that may be failed depending on the prediction data per category can be performed.

A second aspect of the present disclosure relates to a vehicle control device that includes the prediction data generation device according to the first aspect of the present disclosure. The processor is configured to execute the transition prediction process and a command generation process that generates a command for controlling the device in the vehicle based on prediction performed by the transition prediction process. The transition prediction process sets a node corresponding to a current node of the vehicle as a start point node among the nodes stored in the storage device and sets a specific node from candidate nodes reached by one or a plurality of transitions defined by the link stored in the storage device as a predicted node specifying a subsequent state of the vehicle. The transition prediction process includes at least one of a process of selecting the candidate node having a relatively large number of observations as the predicted node preferentially over the candidate node having a relatively small number of observations and a process of selecting the candidate node having a relatively large number of observations of each link connecting the start point node and the candidate node as the predicted node preferentially over the candidate node having a relatively small number of observations of each link connecting the start point node and the candidate node.

The second aspect of the present disclosure enables accurate prediction to be performed earlier than usual by performing prediction using the prediction data in which the node per category and the link per category are defined, and enables the device in the vehicle to be appropriately controlled earlier than usual by using the prediction.

In the vehicle control device according to the second aspect of the present disclosure, the storage device may store, in advance, association information that sets a predetermined node of the directed graph as a fixed node regardless of the storage update process and associates a predetermined process of controlling a predetermined device of the vehicle with the fixed node, and the processor may be configured to execute a fixed command process that executes the predetermined process based on the association information without using the transition prediction process, on a condition that the current node corresponds to the fixed node.

The second aspect of the present disclosure executes the predetermined process without using the transition prediction process on the condition that the current node corresponds to the fixed node. Thus, even when the prediction data includes a node that is caused by an erroneous operation performed by a user, execution of the command generation process based on prediction of a transition to the node corresponding to the inappropriate operation by the transition prediction process can be reduced.

In the vehicle control device according to the second aspect of the present disclosure, the processor may be configured to execute, before executing the fixed command process, an inquiry process that makes an inquiry to a user as to whether or not to execute the fixed command process, and may be configured to execute the fixed command process when the user permits execution of the fixed command process in response to the inquiry.

The second aspect of the present disclosure executes the inquiry process before the fixed command process. Thus, a situation in which the fixed command process is suddenly performed and makes the user feel awkward can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram illustrating electronic devices in a vehicle according to a first embodiment;

FIG. 2 is a flowchart illustrating a procedure of a prediction data storage update process according to the first embodiment;

FIG. 3 is a diagram illustrating a vehicle data group on which an alignment process according to the first embodiment is performed;

FIG. 4 is a diagram illustrating node lists per category according to the first embodiment;

FIG. 5 is a diagram illustrating link lists per category according to the first embodiment;

FIG. 12 is a diagram illustrating an inter-category node list and an inter-category link list according to a fifth embodiment;

FIG. 14 is a diagram illustrating a network including a vehicle and a house according to a seventh embodiment;

FIG. 15A is a diagram illustrating data used in an eighth embodiment;

FIG. 15B is a diagram illustrating data used in the eighth embodiment;

FIG. 15C is a diagram illustrating data used in the eighth embodiment; and

DETAILED DESCRIPTION OF EMBODIMENTS

First Embodiment

Figure 6:
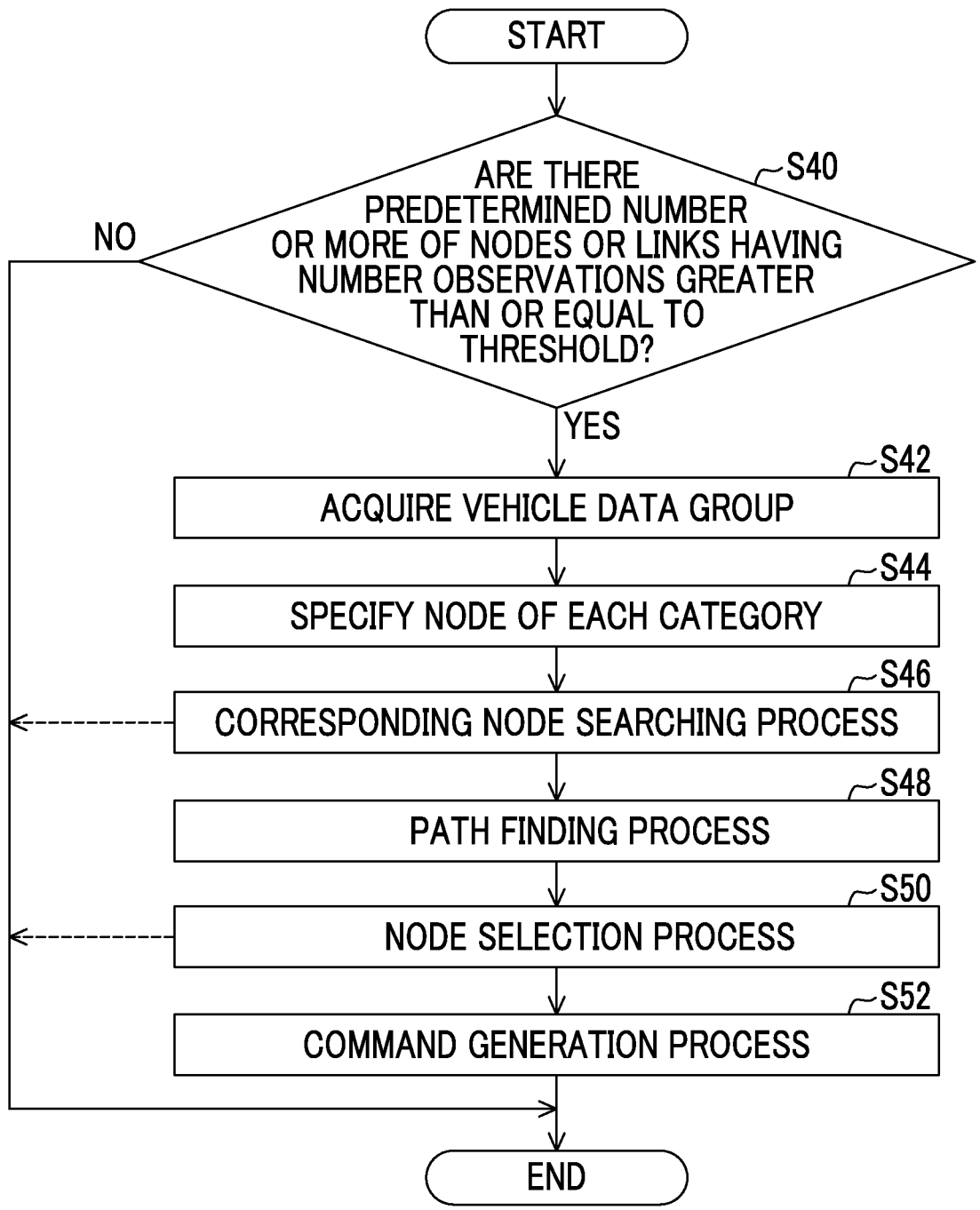
FIG. 6 is a flowchart illustrating a procedure of a transition prediction process and a command generation process according to the first embodiment.

Hereinafter, a first embodiment of a prediction data generation device and a vehicle control device will be described with reference to the drawings.

FIG. 1 illustrates a part of a vehicle 10, particularly a part of electronic devices connected to a network NW. A powertrain chassis system 20 includes a vehicle-mounted propelling device that imparts motive power to drive wheels, a transmission device, a steering actuator that steers a steering wheel, a brake actuator that imparts braking power to wheels, a part of various sensors detecting the states of the vehicle-mounted propelling device, the transmission device, the steering actuator, and the brake actuator, and the like. An electronic control unit (ECU 30) controls the powertrain chassis system 20. For example, the ECU 30 controls output of the vehicle-mounted propelling device, controls steering force for the steering wheel by operating the steering actuator, or controls the gear ratio of the transmission device. The ECU 30 includes a CPU 32, a ROM 34, and a storage device 36. The storage device 36 is an electrically rewritable non-volatile storage device that retains data regardless of supply of power.

A body system 22 includes a vehicle-mounted air-conditioning device, an illumination device, a door lock device, an automatic window opening and closing device, an instrument panel, a part of various sensors that detect the states of the vehicle-mounted air-conditioning device, the illumination device, the door lock device, the automatic window opening and closing device, and the instrument panel, and the like. An electronic control unit (ECU 40) controls the body system 22. For example, the ECU 40 controls the temperature in a vehicle cabin by operating the vehicle-mounted air-conditioning device in accordance with an instruction from a user. In addition, for example, the ECU 40 controls the illuminance, the irradiation direction, and the like of the illumination device in accordance with an instruction from the user. Furthermore, for example, the ECU 40 determines a valid user based on an authentication terminal carried by the user and controls and switches the lock device to a released state on the condition that the user is valid. The ECU 40 includes a CPU 42, a ROM 44, and a storage device 46. The storage device 46 is an electrically rewritable non-volatile storage device that retains data regardless of supply of power.

A multimedia system 60 includes a speaker 61 that outputs audio, an audio sensing device 62 that converts sound vibration into an electrical signal, an image display device 63 such as a liquid crystal display device or an organic EL display device, a touch panel 64 that is disposed on the image display device 63, and an image sensing device 65 that includes, for example, a solid-state imaging element and senses an image of the inside of the vehicle cabin. In addition, the multimedia system 60 includes an M system switch 66 that includes switches for devices of the multimedia system 60.

An electronic control unit (ECU 50) controls the multimedia system 60. The ECU 50 includes a CPU 52, a ROM 54, a storage device 56, and a hard disk 58. The storage device 56 is an electrically rewritable non-volatile storage device that retains data regardless of supply of power.

The ECUs 30, 40, 50 are connected to the network NW. Various switches (switch group 70) of the vehicle 10 that are not directly connected to the ECUs 30, 40, 50, and various sensors (sensor group 72) of the vehicle 10 that are not directly connected to the ECUs 30, 40, 50 are connected to the network NW.

The vehicle 10 further includes a global positioning system (GPS 74). The ECU 50, for example, by outputting an audio signal through the speaker 61, executes a notification process for the user or executes a process of playing a music or the like from the speaker 61 in accordance with an instruction from the user. The ECU 50 changes an image displayed by the image display device 63 in response to an operation performed on the touch panel 64, changes a command for a specified position on the touch panel 64, and executes a process corresponding to the changed command. For example, the ECU 50 extracts map data around the current location from map data stored in the hard disk 58 based on the position of the vehicle 10 detected by the GPS 74, displays the extracted map data on the image display device 63, and changes the area of the displayed map data in accordance with a scroll operation performed on the touch panel 64.

The ECU 50 recognizes an audio signal from the user as an instruction from the user (input operation) based on an output signal of the audio sensing device 62, or recognizes a motion of the user as an instruction from the user (input operation) based on an output signal of the image sensing device 65.

The ECU 50 executes a transition prediction process that uses a directed graph to predict the subsequent state of the vehicle, and a command generation process that controls various devices in the vehicle 10 in accordance with the transition prediction process. Hereinafter, the transition prediction process and the command generation process will be described in detail.

FIG. 2 illustrates a procedure of a prediction data storage update process for the transition prediction process. The process illustrated in FIG. 2 is realized by the CPU 52 repeatedly executing a program stored in the ROM 54 at predetermined cycles. Hereinafter, a step number will be represented by a number with "S" prefixed thereto.

In the series of processes illustrated in FIG. 2, first, the CPU 52 acquires a vehicle data group that includes a plurality of types of data related to devices in the vehicle, by collecting data handled by the ECU 50 and acquiring data handled by the ECUs 30, 40 through the network NW (S10). For example, the data handled by the ECU 30 of the powertrain chassis system 20 relates to a vehicle speed, an accelerator operation amount, a brake operation amount, an outside air temperature, the state of a shift lever, the state of a control mode switch of the transmission device, the rotational angle of the steering wheel (steering angle), the state of a switch that places the vehicle into a state capable of traveling, and the temperature of a refrigerant in a cooling circuit of the vehicle-mounted propelling device. The switch that places the vehicle into a state capable of traveling corresponds to an ignition switch when the vehicle-mounted propelling device is an engine. The data handled by the ECU 40 relates to the state of a blinker lever switch, the state of a light ON and OFF switch, the state of a window opening and closing switch, a detected value of a window opening degree, the state of the door lock device, the state of the air-conditioning device, a detected value of an illuminance sensor that measures the illuminance outside the vehicle, a detected value of a seat presence sensor of each seat, a detected value of a trunk load weight, and the like. The data handled by the ECU 50 relates to positional information provided by the GPS 74, the state of the speaker 61, ON and OFF states of the audio sensing device 62, information related to a display target of the image display device, an operating state of the touch panel 64, ON and OFF states of the image sensing device 65, an operating state of the switch group 70, a detected value of the sensor group 72, and the like.

Next, for each vehicle data group acquired at the same time, the CPU 52 executes an alignment process that aligns the vehicle data group (S12). FIG. 3 illustrates the vehicle data group on which the alignment process is performed. FIG. 3 illustrates that the vehicle data group includes various types of data of A1 to An. As illustrated in FIG. 3, the vehicle data group is grouped by different time T1, T2, . . . , Tm in accordance with time-series order. However, for example, all pieces of data constituting the vehicle data group of time T1 are not meant to be sampled at different sampling timings from all pieces of data constituting the vehicle data group of time T2. For example, for data of which the sampling cycle is longer than the time interval between time T1 and time T2, the data of time T1 and the data of time T2 may be sampled at the same time. For data of which the sampling cycle is shorter than the time interval between time T1 and time T2, the data of time T1 and the data of time T2 are sampled at different sampling timings. However, the data constituting the vehicle data group of time T1 is data that is sampled at the most recent sampling timing at time T1. While data that is sampled at time T1 may be assigned to time T2 in actuality due to a delay or the like in process of a vehicle-mounted device, the data assigned to time T2 is regarded as the most recent data at time T2. In such a case, any data constituting the vehicle data group of time T2 is regarded as data sampled at the same time. The vehicle data groups of time T1 to time Tm illustrated in FIG. 3 mean that the acquisition process of S10 in FIG. 2 is performed m times. For example, the ECUs 30, 40 may assign a timestamp to the time-series data handled by the ECUs 30, 40 and transmit the time-series data sampled at a different time to the ECU 50 in a batched manner. In such a case, the process of S10 includes a process of specifying the vehicle data groups of time T1 to time Tm based on the timestamp. Even when the specification process is performed, the vehicle data group of time Tm is referred to as a vehicle data group that is acquired at a later timing than the vehicle data group of time T1.

Returning to FIG. 2, the CPU 52 specifies a node per category by classifying the vehicle data group acquired at the same time into each of a plurality of predetermined categories (S14). Pieces of data that are considered to be relatively highly correlated with each other belong to the same category. The same data may belong to two or more categories. Types of data constituting one category are partially different from another category. Not all pieces of data of any category are a part of data belonging to another category. All pieces of data belonging to each category are a vehicle data subgroup that includes a plurality of types of data. A vehicle data subgroup, of the vehicle data group acquired at the same time, that belongs to a specific category determines a node of the category. That is, a node specifying process is a process of specifying the value of each data determining a node.

The categories include a category that includes data corresponding to an operation performed by the user on a device in the vehicle 10. The data corresponding to an operation performed by the user on a device in the vehicle 10 includes data that indicates an operating state of the device operated by the user in the vehicle 10, and data that indicates the state of the device associated with the operation performed by the user on the device in the vehicle 10. The data indicating the operating state of the device relates to the accelerator operation amount, the brake operation amount, the state of the shift lever, the steering angle, the state of the switch that places the vehicle into a state capable of traveling, the state of the blinker lever switch, the state of the window opening and closing switch, the state of the M system switch 66, the state of the switch group 70, and the like. The data indicating the state of the device associated with the operation performed by the user on the device includes the detected value of the window opening degree, a type of image displayed on the image display device 63 such as whether the image is an image of a television program or display of map data, and the like. Data other than the data corresponding to the operation performed on the device includes, for example, the outside air temperature, the detected value of the illuminance sensor, and the temperature of the refrigerant in the cooling circuit.

Next, the CPU 52 determines whether or not there is a new node that is not yet specified among the nodes per category specified by the specification process (S16). The process references node lists per category illustrated in FIG. 4 and determines whether or not the same node is already registered in each category. The node lists illustrated in FIG. 4 are stored in the storage device 56. While three categories X, Y, Z are illustrated in FIG. 4 due to a limited space, the number of categories in the present embodiment is not intended to be equal to three.

Returning to FIG. 2, when there is a new node (YES in S16), the CPU 52 assigns a new node ID to the node, adds the node to a node list of a corresponding category among the node lists stored in the storage device 56, and sets the number of observations of the node to "1" (S18). The node ID is illustrated as "sign" in FIG. 4. A sign that is different from the node ID of the already registered node is assigned as the new node ID.

When the CPU 52 completes the process of S18 or makes a negative determination in S16, the CPU 52 determines whether or not there is an existing node already registered in the node list among the specified nodes (S20). When the CPU 52 determines that there is an existing node (YES in S20), the CPU 52 increments the number of observations of the corresponding node in the node list by "1" (S22).

When the CPU 52 completes the process of S22 or makes a negative determination in S20, the CPU 52 determines whether or not there is a new transition among transitions to the specified nodes, that is, whether or not there is a new link (S24). The process references link lists per category illustrated in FIG. 5 and determines whether or not the same link is already registered in each category. The link lists illustrated in FIG. 5 are stored in the storage device 56. A start point node ID of the link lists illustrated in FIG. 5 indicates the node ID of the corresponding category. The CPU 52 sets the node specified by the specification process as an end point node and sets a node from which a transition is made to the end point node as a start point node. When the combination of the start point node and the end point node is not registered in the link lists, the CPU 52 determines that the combination is a new link.

Returning to FIG. 2, when the CPU 52 determines that there is a new link (YES in S24), the CPU 52 assigns a new link ID to the link, adds the link to a link list of a corresponding category among the link lists stored in the storage device 56, and sets the number of observations of the link to "1" (S26). A sign that is different from the link ID of the already registered link is assigned as the new link ID.

When the nodes that are specified by the vehicle data groups acquired at time-series successive timings are the same as each other, a transition is made from one node to the same node and is assigned one link ID. Hereinafter, this type of link will be referred to as a self-loop.

When the CPU 52 completes the process of S26 or makes a negative determination in S24, the CPU 52 determines whether or not there is an existing link already registered in the link list among the specified links (S28). When the CPU 52 determines that there is an existing link (YES in S28), the CPU 52 increments the number of observations of the corresponding link in the link list by "1" (S30).

When the CPU 52 completes the process of S30 or makes a negative determination in S28, the CPU 52 temporarily terminates the series of processes illustrated in FIG. 2. FIG. 6 illustrates a procedure of the transition prediction process that uses the prediction data including the node lists and the link lists. The process illustrated in FIG. 6 is realized by the CPU 52 repeatedly executing a program stored in the ROM 54 at predetermined cycles.

In the series of processes illustrated in FIG. 6, first, the CPU 52 determines whether or not the number of observations of each node in the node lists or the number of observations of each link in the link lists is greater than or equal to a threshold and whether or not the number of such nodes or links is greater than or equal to a predetermined number (S40). The process is performed in order to determine whether or not prediction that uses the node lists and the link lists can be accurately performed.

When the CPU 52 determines that the number of such nodes or links is greater than or equal to the predetermined number (YES in S40), the CPU 52 acquires a vehicle data group (S42). While the process may be performed in the same manner as the process of S10 in FIG. 2, the process, particularly, acquires one most recent vehicle data group acquired at the same time. The CPU 52 specifies a node of each category based on the vehicle data group (S44). The CPU 52 searches for a node corresponding to the node specified in S44 among the nodes registered in the node list of each category (S46). When there is no corresponding node in the process, the CPU 52 temporarily terminates the series of processes illustrated in FIG. 6 as illustrated by a broken line in FIG. 6.

When there is a corresponding node, the CPU 52 sets the node as a start point and finds a path in which a transition made from one node to another node in accordance with the transitions defined by the link lists is made a predetermined number of times (S48). Each transition does not include a self-loop. When the predetermined number of transitions cannot be defined, the CPU 52 temporarily terminates the series of processes illustrated in FIG. 6 as illustrated by a broken line in FIG. 6.

When the CPU 52 finds all paths having the predetermined number of transitions from the start point node for each category, the CPU 52 selects a node having a relatively high possibility of occurrence for each category from candidate nodes that are nodes reached by the predetermined number of transitions in each category, and predicts the selected node to be an occurring node (S50). The present embodiment selects one node for each of the categories by the following process. That is, first, the CPU 52 selects transitions in which the total of the number of observations of links defining the predetermined number of transitions is the largest. Next, the CPU 52 determines whether or not the number of observations of a candidate node corresponding to the selected transitions is greater than or equal to a threshold. When the CPU 52 determines a candidate node of which the number of observations is greater than or equal to the threshold, the CPU 52 sets the node as a predicted node to which a transition will be subsequently made. When the CPU 52 determines a candidate node of which the number of observations is less than the threshold, the CPU 52 selects transitions in which the total of the number of observations of links defining the predetermined number of transitions is the second largest, and determines whether or not the number of observations of each candidate node corresponding to the selected transitions is greater than or equal to the threshold. When the number of observations of a candidate node is greater than or equal to the threshold, the CPU 52 sets the node as a predicted node. Such a process is executed before a candidate node of which the number of observations is greater than or equal to the threshold is found, or before there is no more candidate node. When the CPU 52 cannot specify a predicted node in all categories, the CPU 52 temporarily terminates the series of processes illustrated in FIG. 6 as illustrated by a broken line in FIG. 6.

When there is a predicted node in at least one category, the CPU 52 appropriately executes a process of generating a command for control of a predetermined device depending on the predicted node (S52). Specifically, the present embodiment stores a list of target devices of the command generation process in advance in the ROM 54. The CPU 52 generates a command for a control that makes a transition to the state of a device represented by the predicted node on the condition that the current state of the device registered in the list is different from the state of the predicted node.

The target devices registered in the list are devices operated by the user in the present embodiment. Specifically, the target devices registered in the list include, for example, the speaker 61, the audio sensing device 62, the image display device 63, the touch panel 64, the image sensing device 65, the air-conditioning device, the automatic window opening and closing device, the illumination device, the instrument panel, and the ECUs 30, 50. For the ECUs 30, 50, a list of specific processes is defined as a target of the command generation process. The specific processes of the ECU 30 include, for example, a process related to a control mode of the transmission device. The specific processes of the ECU 50 include a process related to an audio recognition engine, a process related to a gesture recognition engine, and the like. Thus, for example, even when the state of the ECU 30 is different from the state of the predicted node, the ECU 30 having the difference in the state is the target of the command generation process on the condition that the process of the ECU 30 corresponds to the specific processes.

The command generation process will be illustrated. Assume that among the categories, for example, there is a category in which a node is defined by a vehicle data subgroup including the detected values of the seat presence sensors of a rear seat and a driving seat, the state of the image display device 63, a state indicating whether or not an audio reproduction process is performed by the CPU 52, and the detected value of the temperature of the refrigerant in the cooling circuit of the vehicle-mounted propelling device. Assume that on weekdays, the user habitually takes a child on the rear seat, operates the M system switch 66 to display a video of a television program on the image display device 63, takes the child to a kindergarten, and then operates the M system switch 66 to listen to the radio while commuting. In such a case, a node that transitions to a state where the image display device 63 displays a video of a television program after the seat presence sensor of the rear seat and the seat presence sensor of the driving seat detect the presence of a person sitting thereon is observed on every weekday. Thus, when the user takes the child on the rear seat and sits on the driving seat, the CPU 52 has a relatively high possibility of predicting the node indicating the state where the image display device 63 displays a video of a television program to be a node representing a subsequent state. In such a case, even when a map is displayed on the image display device 63 on a holiday, the command generation process causes the ECU 50 to operate the image display device 63 and the speaker 61 to automatically switch to a mode of the state of displaying a television program. In addition, the vehicle is stopped for a very short period of time when the user takes the child to the kindergarten. Thus, when driving of the vehicle is initiated again, the current node is where the refrigerant in the cooling circuit has a certain high temperature and where the seat presence sensor of the driving seat detects the presence of a person sitting thereon. In such a case, the number of observations of a transition to a node that corresponds to a state of stopping a television program and playing the radio from the speaker 61 is increased. Accordingly, when the user takes the child out of the vehicle and again places the vehicle into a state capable of traveling, the CPU 52 stops a mode in which the video of the television program is displayed on the image display device 63, and automatically switches to a mode in which audio data of a radio program is played from the speaker 61. Such prediction and automatic control may also be realized when the positional information of the vehicle 10 is used as the data of the category instead of the detected value of the temperature of the refrigerant.

Assume that among the categories, for example, there is a category in which a node is defined by a vehicle data subgroup that includes the detected values of the seat presence sensors of the driving seat and a passenger seat, a detected value of an outside air temperature sensor, and a set temperature of the air-conditioning device. Assume that even when the detected value of the outside air temperature sensor is the same under the scorching sun in midsummer, the set temperature of the air-conditioning device is different for when the seat presence sensor of the driving seat detects the presence of a person sitting thereon and when the seat presence sensor of the driving seat and the seat presence sensor of the passenger seat detect the presence of a person sitting thereon. In such a case, as nodes corresponding to a significantly high detected value of the outside air temperature, when the presence of a person sitting on the driving seat is detected and when the presence of a person sitting on the driving seat and the presence of a person sitting on the passenger seat are detected, a transition to the node having a different temperature setting of the air-conditioning device is a link having a relatively large number of observations. Thus, when the user takes on the vehicle, drives alone, and then, takes a person on the passenger seat, the CPU 52 has a relatively high possibility of predicting a node having a different setting from the current temperature setting of the air-conditioning device to be a node representing a subsequent state. When such prediction is made, the CPU 52 performs the command generation process to generate a command for changing the temperature setting and output the command to the ECU 40 of the body system 22 through the network NW before the user changes the temperature. Accordingly, the ECU 30 of the body system 22 operates the air-conditioning device to change the set temperature.

Assume that among the categories, for example, there is a category in which a node is defined by a vehicle data subgroup that includes the state of the control mode switch of the transmission device and the state of use of a navigation system. In such a case, depending on the habit of the user, the CPU 52 may automatically execute switching from any one of a normal mode and a sport mode to another. In the sport mode, the rotational speed of the propelling device is increased further than in the normal mode at the same vehicle speed. That is, for example, the user employs the normal mode when the user commutes on weekdays, and on holidays, the user sets a remote destination by using the navigation system and employs the sport mode to drive the vehicle. In such a case, when a remote location is set as a destination by the navigation system, the number of observations of a transition from a node in which the normal mode is set to a node in which the sport mode is set is increased. Accordingly, when the CPU 52 specifies a node that represents a state where the remote location is set as a destination and where the normal mode is set, the CPU 52 generates a command for setting the sport mode and outputs the command to the ECU 30 through the network NW. In addition, the CPU 52 generates a command for display indicating the sport mode on the instrument panel and outputs the command to the ECU 40 through the network NW. Such prediction and automatic control may also be realized when the state of the instrument panel is used as the data of the category instead of the state of the control mode switch of the transmission device.

The CPU 52 temporarily terminates the series of processes illustrated in FIG. 6 when the CPU 52 completes the command generation process, when the CPU 52 cannot generate an appropriate command, or when the CPU 52 makes a negative determination in S40.

An action of the present embodiment will be described. The CPU 52 executes the specification process that specifies a node per category, by extracting data belonging to each of the categories from the vehicle data group acquired at the same time. When the specified node is an existing node, the CPU 52 increments the number of observations of the node. When a transition of a node is observed and is an existing link, the CPU 52 increases the number of observations of the link. When all possibilities that the vehicle data group may have are considered, types of nodes and types of links that the vehicle data group may have are increased as the number of pieces of data constituting a node is larger. Thus, when a node is defined per category, a node of which the number of observations is increased earlier than usual appears more than when a node is not defined per category. Thus, the CPU 52 makes a positive determination in the process of S40 earlier than usual and can accurately predict a transition of a node earlier than usual by using the prediction data including the directed graph.

Second Embodiment

Hereinafter, a second embodiment will be described with reference to the drawings based on differences from the first embodiment.

Figure 7:
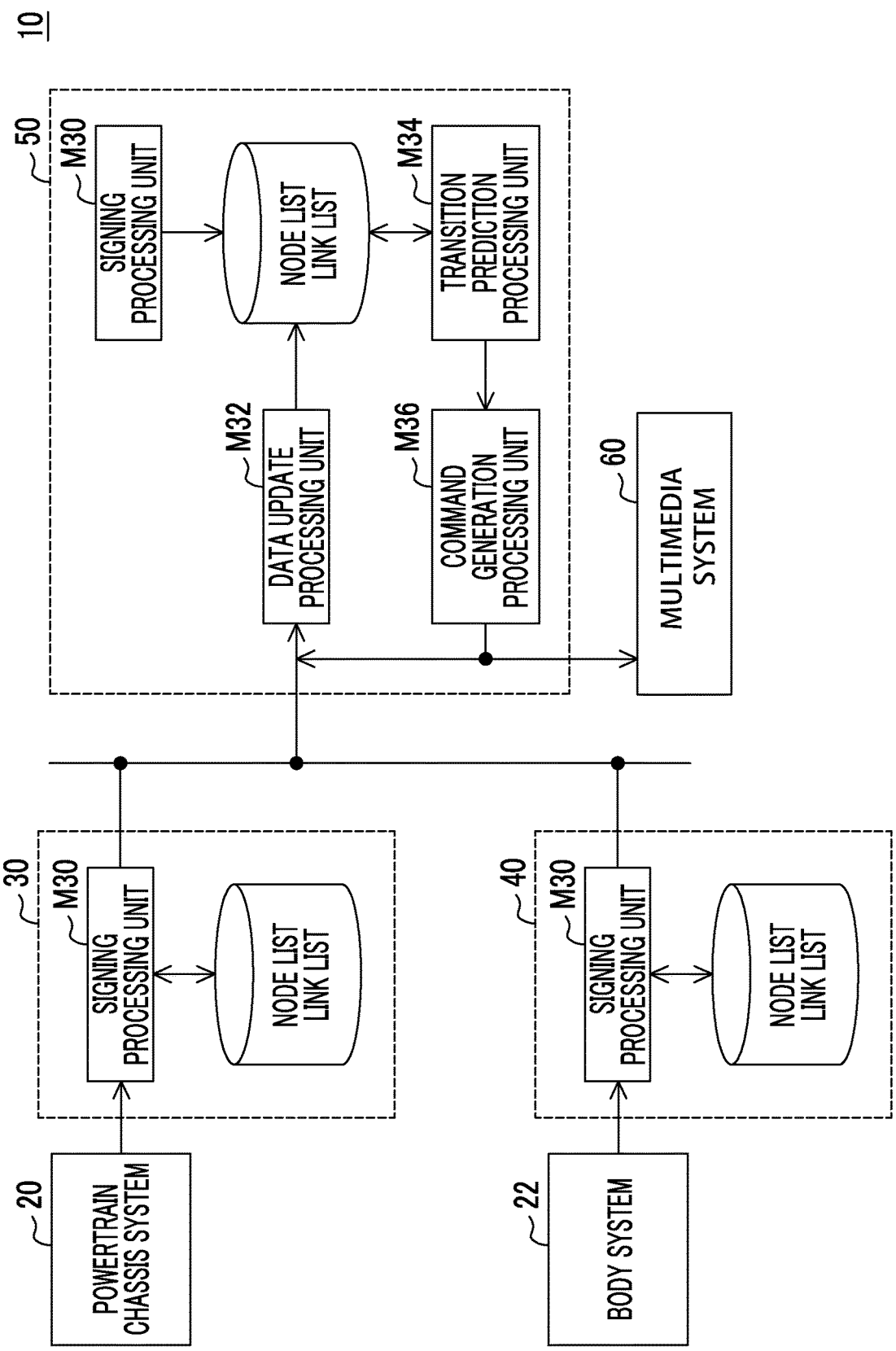
FIG. 7 is a block diagram illustrating processes in each ECU according to a second embodiment.

FIG. 7 illustrates devices in the vehicle 10 according to the present embodiment along with a block diagram of a part of processes thereof. In FIG. 7, members corresponding to the members illustrated in FIG. 1 will be designated by the same reference signs for convenience.

In the present embodiment, data handled by the ECU 30 of the powertrain chassis system 20 constitutes one category, and a node list and a link list of the category are generated in the ECU 30. That is, a signing processing unit M30 is realized by the CPU 32 executing a program stored in the ROM 34, and the signing processing unit M30 executes a process corresponding to the process in FIG. 2. Specifically, a data group handled by the ECU 30 is acquired in the process of S10, and a node that is represented by the acquired data group is specified in the process of S14. The specified node is subjected to a registration process, or the number of observations of the node is incremented. A link that is based on a transition to the specified node is subjected to a registration process, or the number of observations of the link is incremented. The node list and the link list of the category corresponding to the ECU 30 are stored in the storage device 36 of the ECU 30 and are stored in the storage device 56 in the ECU 50. That is, the CPU 32 outputs new updated differential data related to the node list and the link list to the ECU 50 through the network NW at a predetermined timing.

In the present embodiment, data handled by the ECU 40 of the body system 22 constitutes one category, and a node list and a link list of the category are generated in the ECU 40. That is, the signing processing unit M30 is realized by the CPU 42 executing a program stored in the ROM 44, and the signing processing unit M30 executes a process corresponding to the process in FIG. 2. Finally, the node list and the link list of the category corresponding to the ECU 40 are stored in the storage device 46 of the ECU 40 and the storage device 56 in the ECU 50. That is, the CPU 42 outputs new updated differential data related to the node list and the link list to the ECU 50 through the network NW at a predetermined timing.

In the present embodiment, data handled by the ECU 50 of the multimedia system 60 constitutes one category, and a node list and a link list of the category are generated in the ECU 50. That is, the signing processing unit M30 is realized by the CPU 52 executing a program stored in the ROM 54, and the signing processing unit M30 executes a process corresponding to the process in FIG. 2. A data update processing unit M32 updates the node list and the link list of the category of the ECU 30 and the node list and the link list of the category of the ECU 40 stored in the storage device 56, based on the differential data transmitted from the ECUs 30, 40. The data update processing unit M32 is realized by the CPU 52 executing a program stored in the ROM 54. A transition prediction processing unit M34 is realized by the CPU 52 executing a program stored in the ROM 54, and the transition prediction processing unit M34 executes the processes of S40 to S50 in FIG. 6. A command generation processing unit M36 is realized by the CPU 52 executing a program stored in the ROM 54, and the command generation processing unit M36 executes the process of S52 in FIG. 6.

The present embodiment can easily perform categorization by configuring categories per data handled by each of the ECUs 30, 40, 50. The present embodiment can reduce processing load of the CPU 52 further than usual by generating update data of the node list and the link list per category in each of the ECUs 30, 40, 50. In the present embodiment, each of the ECUs 30, 40 transmits the differential data of the node list and the link list thereof at a predetermined timing. Thus, the amount of data in the network NW can be reduced further than when each of the ECUs 30, 40 transmits, to the ECU 50 at a predetermined timing, a vehicle data subgroup that is the handled data thereof.

Third Embodiment

Hereinafter, a third embodiment will be described with reference to the drawings based on differences from the first embodiment.

Figure 8:
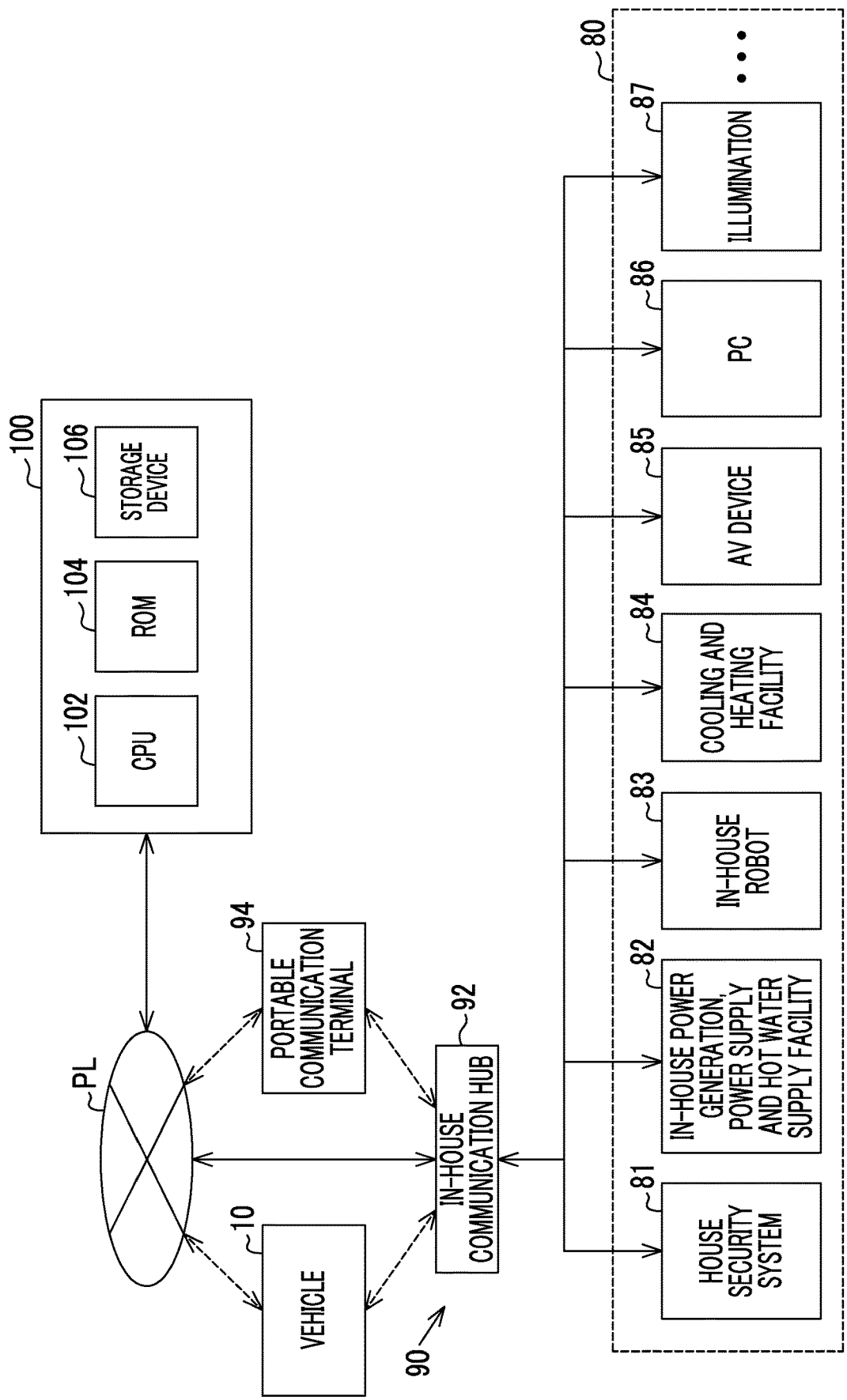
FIG. 8 is a diagram illustrating a network including a vehicle and a house according to a third embodiment.

FIG. 8 illustrates a system configuration according to the present embodiment. In the present embodiment, the vehicle 10 not only has the same configuration as in FIG. 1 but also can communicate with an ECU 100 outside the vehicle through a public network PL and can communicate with an in-house communication hub 92 of a house 90.

The in-house communication hub 92 can communicate with various devices (house system 80) disposed in the house 90. The in-house communication hub 92 can communicate with a portable communication terminal 94 such as a multifunctional portable telephone that is carried by a resident in the house 90.

The house system 80 includes a house security system 81 that monitors the state or the like of a lock of the house 90, an in-house power generation, power supply and hot water supply facility 82 that generates power, controls supply of power from a system power source, and controls heating and storage of water, an in-house robot 83 such as a cleaning robot, a wearable robot, or a talking robot, and a cooling and heating facility 84. In addition, the house system 80 includes an audio and visual device 85, a personal computer 86, and an illumination 87.

The ECU 100 can communicate not only with the vehicle 10 but also with the in-house communication hub 92 and the portable communication terminal 94 through the public network PL. The ECU 100 includes a CPU 102, a ROM 104, and a storage device 106. The storage device 106 is an electrically rewritable non-volatile storage device.

The ECU 100 generates prediction data including a node list and a link list based on a vehicle data group and a data group of the house system 80 and executes a transition prediction process and a command generation process based on the prediction data.

Figure 9:
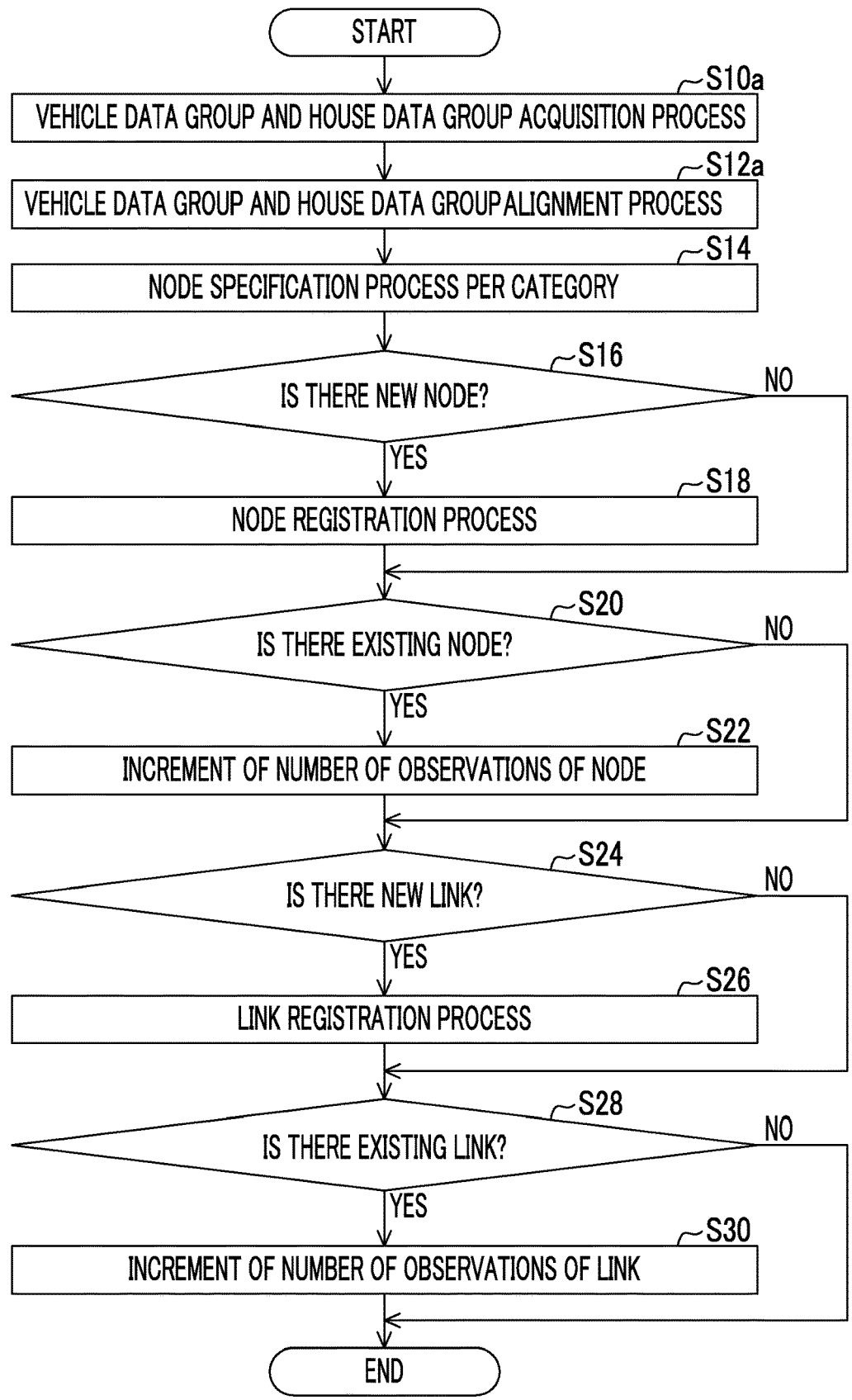
FIG. 9 is a flowchart illustrating a procedure of a prediction data storage update process according to the third embodiment.

FIG. 9 illustrates a procedure of a prediction data storage update process for the transition prediction process. The process illustrated in FIG. 9 is realized by the CPU 102 repeatedly executing a program stored in the ROM 104 at predetermined cycles. In FIG. 9, processes corresponding to the processes illustrated in FIG. 2 will be designated by the same reference signs and will not be described for convenience.

In the series of processes illustrated in FIG. 9, first, the CPU 102 acquires a vehicle data group output by the vehicle 10 and a house data group that is the data group of the house system 80 output by the in-house communication hub 92 (S10a). The house data group includes a plurality of types of data related to the devices of the house system 80. The CPU 102 executes a process of alignment the vehicle data group and the house data group acquired at the same time in a batched manner as in the process of S12 in FIG. 2 (S12a). The CPU 102 executes the same processes as the processes of S14 to S30 in FIG. 2 on the acquired and aligned data groups.

Figure 10:
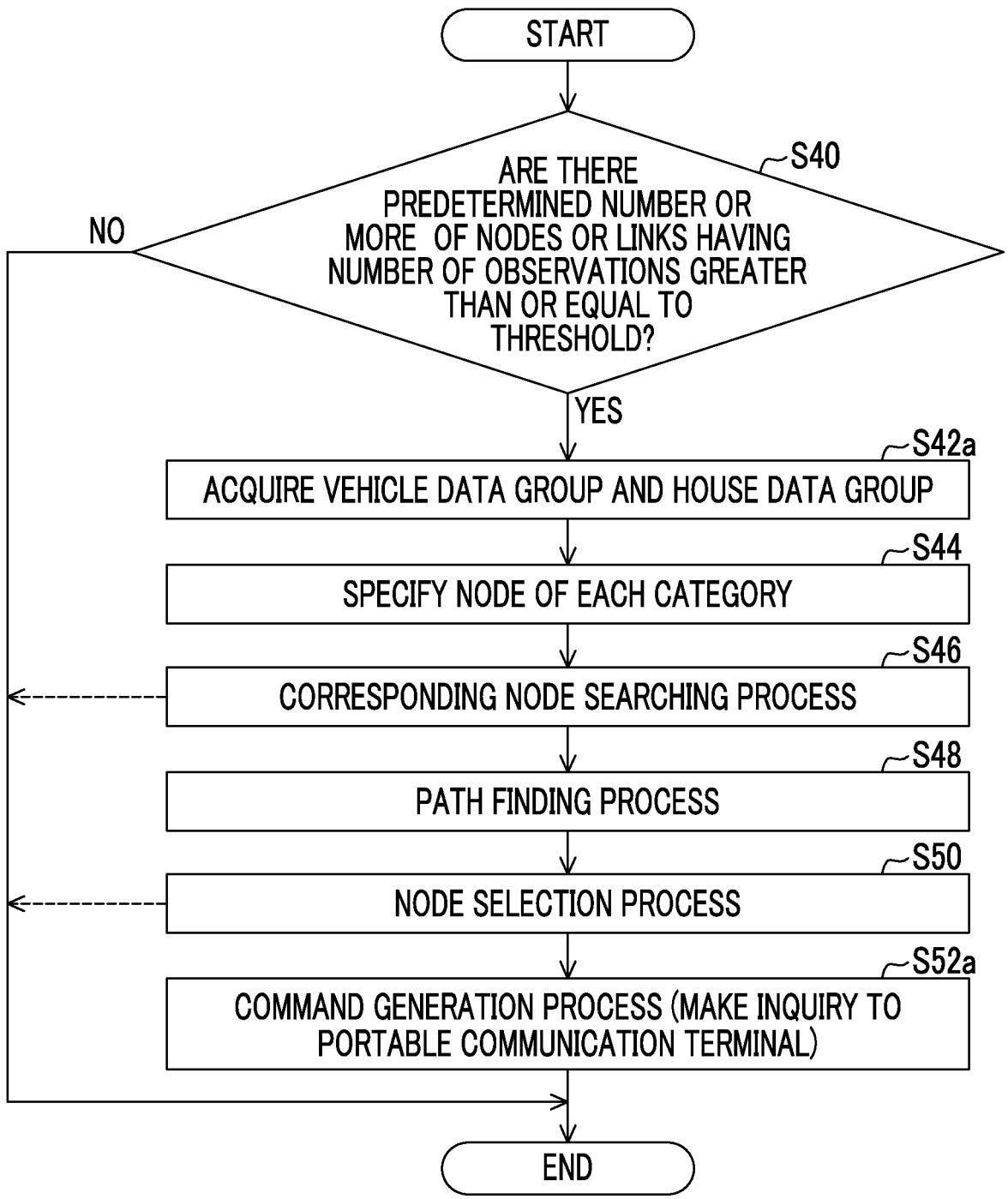
FIG. 10 is a flowchart illustrating a procedure of a transition prediction process and a command generation process according to the third embodiment.

FIG. 10 illustrates a procedure of the transition prediction process that uses the prediction data generated by the process in FIG. 9. The process illustrated in FIG. 10 is realized by the CPU 102 repeatedly executing a program stored in the ROM 104 at predetermined cycles. In FIG. 10, processes corresponding to the processes illustrated in FIG. 6 will be designated by the same step numbers and will not be described for convenience.

In the series of processes illustrated in FIG. 10, the CPU 102 acquires the vehicle data group and the house data group when the process of S40 is completed (S42a). The CPU 102 executes the same processes as the processes of S44 to S50 in FIG. 6 and then, appropriately executes the command generation process by executing a process of making an inquiry to the user (S52a). Hereinafter, the command generation process when the inquiry process is executed will be illustrated.

Data of the cooling and heating facility 84 of the house system 80 and data of the air-conditioning device in the vehicle 10 are illustrated as belonging to the same category. In such a case, for example, in winter, the number of observations of a transition from a node having data that switches to a heating OFF state in the house system 80 to a node in which the air-conditioning device of the vehicle 10 is operated into a heating ON state is increased. Accordingly, when the CPU 102 detects the node having the data that switches to the heating OFF state in the house system 80, the CPU 102 can generate a command for placing the air-conditioning device into the heating ON state for the vehicle 10 and output the command to the vehicle 10 through the in-house communication hub 92.

The CPU 102 transmits a signal to the portable communication terminal 94 before actually outputting the command for controlling devices, in order to make an inquiry as to whether or not to actually execute control. In such a case, the CPU 102 actually outputs the command for controlling devices on the condition that the user permits execution of control in response to the inquiry by using the portable communication terminal 94.

Fourth Embodiment

Hereinafter, a fourth embodiment will be described with reference to the drawings based on differences from the third embodiment.

Figure 11:
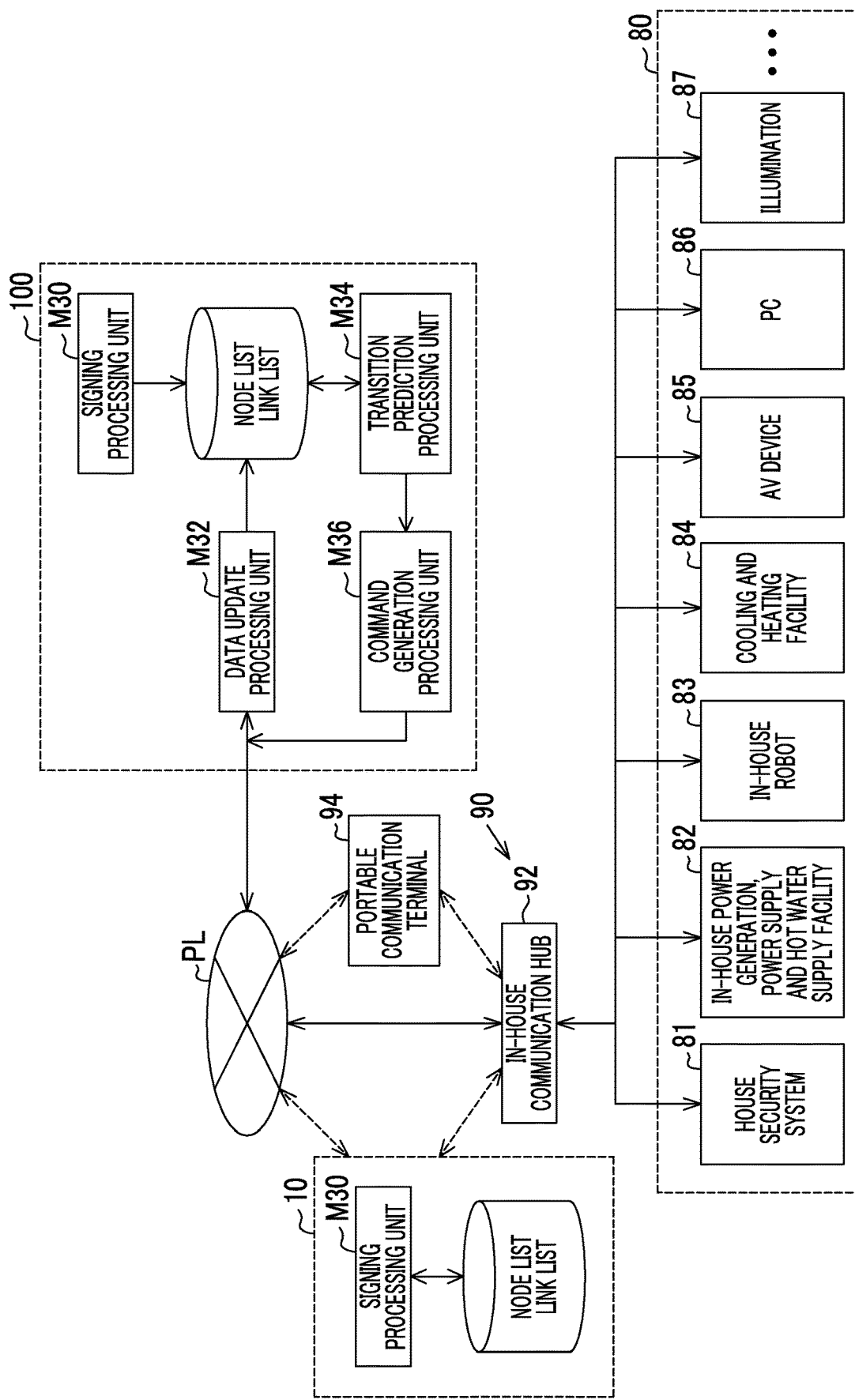
FIG. 11 is a diagram illustrating a network including a vehicle and a house according to a fourth embodiment.

FIG. 11 illustrates the vehicle 10 and the house 90 according to the present embodiment along with a block diagram of a part of processes thereof. In FIG. 11, members corresponding to the members illustrated in FIG. 8 will be designated by the same reference signs for convenience.

The present embodiment does not have a category in which a vehicle data group and a house data group are mixed. In the vehicle 10, the signing processing unit M30 is realized by the CPU 52 executing a program stored in the ROM 54, and the signing processing unit M30 executes the process in FIG. 2. Differential data that is related to a node list and a link list stored in the storage device 56 and is updated for a predetermined period of time is output to the ECU 100 from the vehicle 10 through the public network PL. The data update processing unit M32 in the ECU 100 updates node data and link data of a category that is related to the vehicle 10 and is stored in the storage device 106, based on the differential data transmitted from the vehicle 10. The signing processing unit M30 in the ECU 100 defines a node from the house data group, generates a node list and a link list, and stores the node list and the link list in the storage device 106.

The transition prediction processing unit M34 is realized by the CPU 102 executing a program stored in the ROM 104. The transition prediction processing unit M34 performs a process of predicting a transition of a node for each category belonging to the vehicle 10 and each category belonging to the house 90, based on the node list and the link list stored in the storage device 106. The command generation processing unit M36 is realized by the CPU 102 executing a program stored in the ROM 104. The command generation processing unit M36 generates a command for devices in the house system 80 and devices of the vehicle 10 based on the predicted node and outputs the command to the house system 80 and the vehicle 10.

Fifth Embodiment

Hereinafter, a fifth embodiment will be described with reference to the drawings based on differences from the fourth embodiment.

When a category in which a vehicle data group and a house data group are mixed does not exist as in the fourth embodiment, categories can be more easily designed than when a mixed category exists. However, a transition from any one of a node defined from the house data group and a node defined from the vehicle data group to another cannot be predicted. Therefore, the present embodiment defines an inter-category node by a set of node IDs of each category and defines a transition of the inter-category node by an inter-category link.

FIG. 12 illustrates an inter-category node list and an inter-category link list. The inter-category node list and the inter-category link list are stored in the storage device 106. As illustrated in FIG. 12, the inter-category node list is data that defines an inter-category node by a combination of node IDs for each of the categories X, Y, Z, . . . , and has the number of observations of the inter-category node. The inter-category link list is data that defines a transition from one of a pair of time-series successive inter-category nodes to another and has the number of observations of the link. The inter-category node list and the inter-category link list are generated by the CPU 102 by the same process as a process of generating a node list per category and a link list per category.

The number of observations of the inter-category node and the number of observations of the inter-category link are increased more slowly than the number of observations of the node per category and the number of observations of the link per category. Thus, a transition prediction process that uses the inter-category node list and the inter-category link list may be executable later than a timing when the transition prediction process using the node list per category and the link list per category is executable. However, by generating the inter-category node list and the inter-category link list, prediction that cannot be performed with the node list per category and the link list per category can be performed when the number of observations is increased in the inter-category node list and the inter-category link list.

Sixth Embodiment

Hereinafter, a sixth embodiment will be described with reference to the drawings based on differences from the third embodiment.

Figure 13:
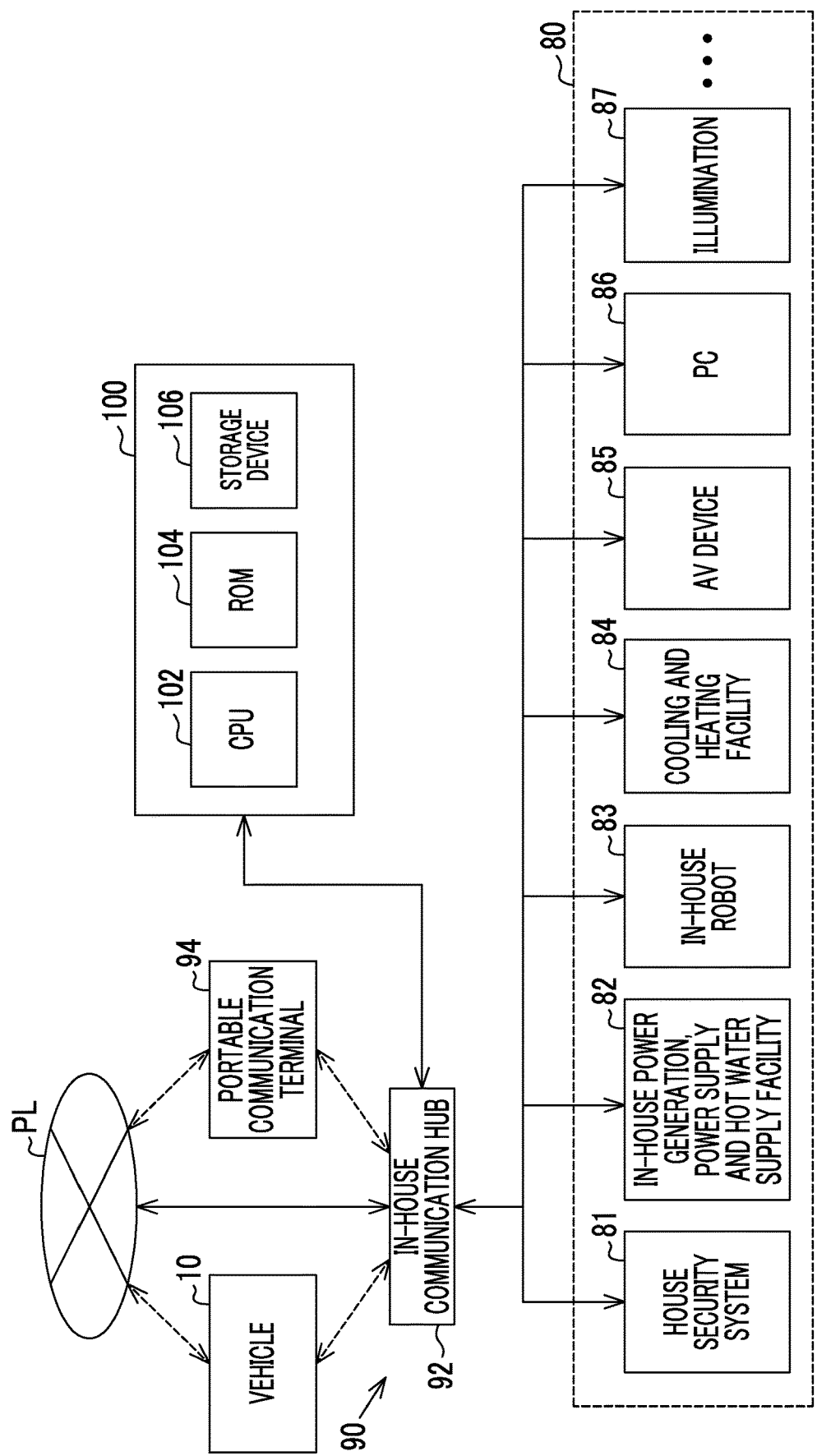
FIG. 13 is a diagram illustrating a network including a vehicle and a house according to a sixth embodiment.

FIG. 13 illustrates the vehicle 10 and the house 90 according to the present embodiment along with a block diagram of a part of processes thereof In FIG. 13, members corresponding to the members illustrated in FIG. 8 will be designated by the same reference signs for convenience.

The present embodiment is different from the third embodiment in that the ECU 100 is included in the house 90 and in that the ECU 100 communicates with the public network PL or the like through the in-house communication hub 92.

Seventh Embodiment

Hereinafter, a seventh embodiment will be described with reference to the drawings based on differences from the fourth embodiment.

FIG. 14 illustrates the vehicle 10 and the house 90 according to the present embodiment along with a block diagram of a part of processes thereof In FIG. 14, members corresponding to the members illustrated in FIG. 11 will be designated by the same reference signs for convenience.

The present embodiment is different from the fourth embodiment in that the ECU 100 is included in the house 90 and communicates with the public network PL or the like through the in-house communication hub 92.

Eighth Embodiment

Hereinafter, an eighth embodiment will be described with reference to the drawings based on differences from the first embodiment.

The first embodiment generates a node list and a link list while acquiring a vehicle data group in order. In addition to the node list and the link list that are postliminarily generated, a fixed node list that is a preset node list, and a fixed link list that is a preset link list are stored in advance in the storage device 56 in the present embodiment.

FIG. 15A illustrates the fixed node list, and FIG. 15B illustrates the fixed link list. As illustrated in FIG. 15A and FIG. 15B, the fixed node list represents a fixed node ID, a combination of vehicle data that defines a node specified by the fixed node ID, and the values of the vehicle data. The fixed link list is data in which one fixed node ID is set as a start point node ID and in which an issued command parameter is set.

In the present embodiment, the number of types of vehicle data defining a node specified by the fixed node ID is not equal to the number of types of vehicle data defining a node in each category and is smaller than the number of types of vehicle data defining a node in each category. The reason is because the number of types of data defining a node per category is greater than the number of types of data used for specifying a state where a process specified by the issued command parameter is executed.

Figure 16:
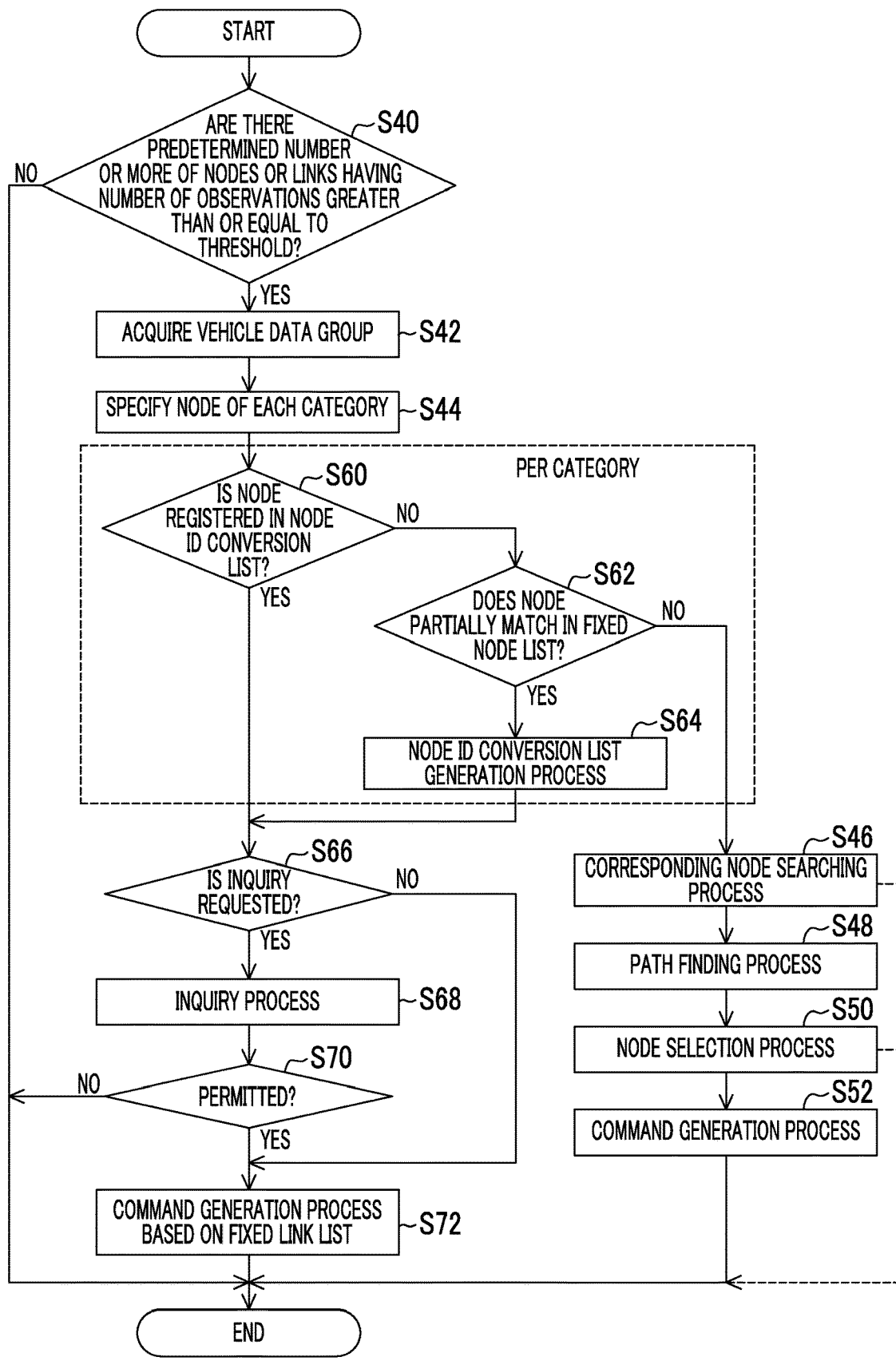
FIG. 16 is a flowchart illustrating a procedure of a transition prediction process and a command generation process according to the eighth embodiment.

FIG. 16 illustrates a procedure of a transition prediction process and a command generation process according to the present embodiment. The process illustrated in FIG. 16 is realized by the CPU 52 repeatedly executing a program stored in the ROM 54 at predetermined cycles. In FIG. 16, processes corresponding to the processes illustrated in FIG. 6 will be designated by the same step numbers and will not be described for convenience.

In the series of processes illustrated in FIG. 16, when the process of S44 is completed, the CPU 52 executes processes of S60 to S64 for each node of the categories specified by the process of S44. That is, first, the CPU 52 determines whether or not the node per category is registered in a node ID conversion list described below (S60). When the CPU 52 determines that the node is not registered (NO in S60), the CPU 52 determines whether or not there is a fixed node that partially matches the node per category specified by the process of S40 among the fixed nodes defined in the fixed node list (S62). Partial matching between the specified node and the fixed node means that, for example, when there are N types of data that defines the fixed node, the value of data defining the fixed node matches the value of data defining the specified node for each of the N types of data.

When the CPU 52 determines that there is no fixed node that partially matches the node per category specified by the process of S40 (NO in S62), the CPU 52 transitions to the process of S46. When the CPU 52 determines that there is a fixed node that partially matches the node per category specified by the process of S40 (YES in S62), the CPU 52 registers, in the node ID conversion list illustrated in FIG. 15C, the node that partially matches the specified node (S64). As illustrated in FIG. 15C, the node ID conversion list represents a node ID per category that partially matches a fixed node defined by a fixed node ID. The partially matching node ID per category that is associated with the fixed node may exist in plural number.

Returning to FIG. 16, when the CPU 52 completes the process of S64 or makes a positive determination in the process of S60, the CPU 52 determines whether or not the command parameter in the fixed link list requests making an inquiry to the user (S66). When an inquiry to the user is requested (YES in S66), the CPU 52, for example, outputs an audio signal from the speaker 61 to make an inquiry to the user as to whether or not to execute a predetermined process (S68). When the user permits execution of the predetermined process in response to the inquiry (YES in S70), or when the CPU 52 makes a negative determination in S66, the CPU 52 generates a command based on a command link list (S72). The response from the user can be confirmed based on, for example, an output signal of the audio sensing device 62.

When the CPU 52 completes the process of S72 or makes a negative determination in S70, the CPU 52 temporarily terminates the series of processes illustrated in FIG. 16. An action of the present embodiment will be described.

Suppose that, for example, a phenomenon in which the user erroneously operating the shift lever does not select a drive position and causes the vehicle to travel at a low gear continues accidentally. Then, when a node is predicted in accordance with the link list per category, the transmission device may be shifted to the low gear in the command generation process of S52 at the time of the user taking on the vehicle 10 and placing the vehicle in a state capable of traveling. A fixed node is defined by, for example, a state where the transmission device is in a parking position and where the vehicle 10 is in a state capable of traveling. The fixed link list associates the fixed node with a command parameter that causes making an inquiry "shift to the drive position?" to the user and then receiving permission and shifting the transmission device to the drive position. Accordingly, when the vehicle 10 is switched to a state capable of traveling, an audio signal saying "shift to the drive position?" is output to the user from the speaker 61. Thus, erroneous prediction due to an accidental behavior of the user can be reduced.

Suppose that, for example, the user always closes windows when the user takes out of the driving seat and moves away from the vehicle 10 in a state where an object having a weight of a level causing reaction of the seat presence sensor is placed on the rear seat. Then, a state where the windows are closed is predicted when the user takes out of the driving seat, even when a person is actually sitting on the rear seat. A fixed node is specified by, for example, a state where the outside air temperature is higher than or equal to a predetermined temperature, where the seat presence sensor of the rear seat reacts, and where the vehicle is locked in a state where the seat presence sensor of the driving seat does not react. In such a case, a command for opening the windows and making an alert is generated. Accordingly, for example, a situation in which all windows are closed with a person sitting on the rear seat under the scorching sun is reduced.

The fixed node also enables dealing with an instruction that is not provided in time in a usual situation. That is, assume that, for example, the audio sensing device 62 senses an audio signal saying "close the window", that the CPU 52 outputs an instruction based on the audio signal to the ECU 40 of the body system 22 to operate a power window, and that the user feels that the opening degree of the window is appropriate and says "stop" when the window is being closed. In such a case, the CPU 52 may recognize the word based on an audio recognition dictionary and then output an instruction to the ECU 40 to stop the operation of closing the window. However, the instruction may not be provided in time. When a fixed node is specified by a state where a control that closes the window is executed and where the audio sensing device 62 senses audio, and when the fixed node is associated with a command for stopping closing of the window, the audio "stop" said by the user can be dealt with promptly.

The CPU 52 and the ROM 54 in FIG. 1, the CPUs 32, 42, 52 and the ROMs 34, 44, 54 in the embodiment illustrated in FIG. 7, the CPU 102 and the ROM 104 in FIG. 8, and the CPUs 52, 102 and the ROMs 54, 104 in FIG. 11 function as a processor. The storage device 56 in FIG. 1, the storage devices 36, 46, 56 in FIG. 7, the storage device 106 in FIG. 8, and the storage devices 56, 106 in FIG. 11 function as a storage device. The processes of S10 to S30 in FIG. 2 are the example of a storage update process. The ECU 50 in FIG. 1, the ECUs 30, 40, 50 in FIG. 7, the ECU 100 in FIG. 8, and the ECUs 50, 100 in FIG. 11 function as a prediction data generation device. The ECU 30 and the ECU 40 function as a first control device and a second control device. The process of the data update processing unit M32 and the process of signing processing unit M30 in each of the ECUs 30, 40, 50 in FIG. 7 are the example of a storage update process. The processes of S42 to S50 are the examples of a transition prediction process. The fixed node list in FIG. 15A and the fixed link list in FIG. 15B are examples of association information. The process of S72 is an example of a fixed command process.

Other Embodiments

At least one of the matters in the embodiments may be changed as follows.

Node Registration Process

When a node that is specified based on the acquired data group is not yet registered, the node is registered in the node list in order in the embodiments. However, the disclosure is not limited thereto. For example, the node may be registered in the node list when the period of time that the node lasts is longer than or equal to a predetermined period of time. In such a case, when the period of time that the node lasts is shorter than the predetermined period of time, the node may be discarded. Alternatively, the node may be queued in a sublist and then may be registered in the node list when, for example, at least one of a transition source and a transition destination of the node exists in plural number.

Transition Prediction Process

The transition prediction process that sets the current node as a start point node and predicts other nodes of a transition destination from the start point node is not limited to the transition prediction process illustrated in the embodiments. For example, without reference to the number of observations of nodes, a candidate node that has the largest number of observations of a link thereto among candidate nodes reached by a predetermined number of transitions in accordance with transitions defined by the link list from the start point node may be predicted to be the transition destination. When the number of observations of nodes is not used, the number of observations of nodes may not be included in the prediction data.

Alternatively, for example, a candidate node that has the largest average value of the number of observations per transition thereto among candidate nodes reached by transitions made each number of times from once to a predetermined plurality of times in accordance with transitions defined by the link list from the start point node may be predicted to be the transition destination. The average value of the number of observations of transitions is a value that is acquired by dividing the total of the number of observations of each link determining transitions from the start point node to the candidate node by the number of transitions. For example, when a pair of candidate nodes having the same average value is generated, a candidate node that has a relatively larger number of observations may be set as a predicted node of the transition destination.

The transition prediction process uses the number of observations of links. However, the disclosure is not limited thereto. For example, a node at which the average value of the number of observations of each node from a node subsequent to the start point node to the end point node is the largest among nodes reached by transitions made each number of times from once to a predetermined plurality of times in accordance with transitions defined by the link list from the start point node may be predicted to be the node of the transition destination. Such a process considers the case of passing a node having a relatively large number of observations to occur more likely than the case of passing a node having a relatively small number of observations. When the number of observations of links is not used, the number of observations of links may not be included in the prediction data.

The transition prediction process may include, for example, a process of setting, in advance, a candidate node that is different from the current node and may be a target node of the command generation process. The process can be realized by determining a predicted node such that a node that has the largest average number of observations of links thereto is specified after excluding a candidate node from which the current node is not reached when transitions defined in the link list are reversely made, and a candidate node that turns to another candidate node during the reverse transitions.

Command Generation Process

The embodiments set target devices of the command generation process in advance and generate a command for making a transition to a state represented by a predicted node on the condition that the current state of the set device is different from the state represented by the predicted node. However, the disclosure is not limited thereto. For example, non-target devices of the command generation process may be set in advance, and the command for making a transition to the state represented by the predicted node may be generated on the condition that the current state of a non-set device is different from the state represented by the predicted node. The list of target devices may not be stored in the ROM 54 and may be stored in, for example, the storage device 56.

When, for example, data of a device that is not desired to be the target of the command generation process is not included in data constituting a node, target devices of the command generation process or non-target devices of the command generation process do not have to be determined in advance as a list.

The command generation process generates a command for switching to an operating state of a device defined by the predicted node when there is a difference in the operating state of the device operated by the user between the predicted node and the current node. However, the disclosure is not limited thereto. For example, the user may be supported to operate the device into the state of the device represented by the predicted node when there is a difference in the operating state of the device operated by the user between the predicted node and the current node. Such a support can be realized by increasing the probability of determining that a word or a sentence of an instruction to reproduce a radio program among words or sentences in the audio recognition dictionary matches audio data sensed by the audio sensing device 62, when, for example, the predicted node represents a state of performing a reproduction process for the radio program and when currently the reproduction process for the radio program is not being performed. Such a process of recognizing the intention of an input operation provided by the user also includes a gesture recognition process that is based on an output signal of the image sensing device 65. The gesture recognition process can be performed in the same manner.

The command generation process makes a transition to the state represented by the predicted node when there is a difference in the operating state of the device operated by the user between the state represented by the predicted node and the current node. However, the disclosure is not limited thereto. For example, when a transition to a node in which the temperature of the refrigerant in the cooling circuit is excessively increased is observed a number of times in a state where the outside air temperature is higher than or equal to a predetermined temperature and where a predetermined amount or more of a load is detected in the trunk, the temperature of the refrigerant can be predicted to be excessively increased by a node that represents a state where the outside air temperature is higher than or equal to a predetermined temperature and where a predetermined amount or more of a load is detected in the trunk. In such a case, for example, the ECU 30 may change gain of a refrigerant circulation control in the cooling circuit based on the prediction. When such a control is executed, data that corresponds to the operating state of the device operated by the user may not be included in a data subgroup constituting a category.

Prediction Data Generation Device

The prediction data generation device is not limited to the prediction data generation device illustrated in each of the embodiments. For example, when the vehicle data subgroup handled by the ECU 30, the vehicle data subgroup handled by the ECU 40, and the vehicle data subgroup handled by the ECU 50 are classified into different categories, the ECU 30 and the ECU 40 may assign a timestamp to data that is acquired at the same time in the vehicle data subgroups belonging to the corresponding categories, and may store the data. In such a case, the data stored by the ECU 30 and the ECU 40 may be transmitted to the ECU 50 through the network NW when the vehicle 10 is placed into a state incapable of traveling by switching OFF the switch that places the vehicle 10 into a state capable of traveling. In such a case, the CPU 52 can perform a process corresponding to the process illustrated in FIG. 2 to update the node list and the link list of the category corresponding to the ECU 30 and the category corresponding to the ECU 40 and stored in the storage device 56.

The prediction data generation device may not be configured with, for example, the ECU 50 of the multimedia system in the vehicle 10 as in the first embodiment. The prediction data generation device may be configured with a dedicated ECU that is different from any ECU illustrated in FIG. 1 and handles the prediction data.

Data Group

For example, data related to road information or the like for traveling of the vehicle 10 or data related to time may be included in the data group used for specifying a node.

Inquiry Process

The embodiments execute the inquiry process by using audio guidance with an audio signal. However, the disclosure is not limited thereto. For example, the inquiry process may be executed with a head-up display by displaying visual information as to the content of an inquiry as a virtual image in front of a windshield. Permission of the user in response to the inquiry process may not be provided as an audio input operation. For example, permission of the user may be provided as a gesture input operation to the image sensing device 65 or as an input operation on the touch panel 64.

Vehicle Control Device

The configuration illustrated in FIG. 14 may be changed such that the process of the command generation processing unit M36 is executed by the CPU 52 or the like in the vehicle 10. In such a case, the ECU 100 performs the process of the command generation processing unit M36 that is related to the house 90.

Processor

While the embodiments illustrate a ROM as the program storage constituting the processor and do not describe the type of ROM, the program storage may be, for example, a non-rewritable memory or may be, for example, an electrically rewritable non-volatile memory.

The processor is not limited to a software processing circuit that includes a program storage such as a ROM storing a program and a CPU executing the program. The processor may be a dedicated hardware circuit such as an ASIC that executes a predetermined process. Furthermore, the processor may be configured to include both a software processing circuit and a dedicated hardware circuit. Such an processor can be realized by, for example, including a dedicated hardware circuit that executes the process of FIG. 2, and a dedicated software processing circuit that executes the process of FIG. 6.

Storage Device

The storage device of the prediction data is not limited to an electrically rewritable non-volatile storage device. For example, the storage device may include both a non-volatile memory and a volatile RAM. In such a case, for example, the RAM may store data when the data update process is executed, and the data stored in the RAM may be stored in the non-volatile memory before a main power source of the ECU is placed into an OFF state. The storage device may be a backup RAM to which supply of power is maintained even when the main power source of the ECU is placed into the OFF state. In such a case, the storage device desirably includes, for example, a power storage device that can maintain supply of power to the RAM across a battery replacement period.

Others

Control units in the vehicle 10 are not limited to the control units illustrated in FIG. 1. For example, a control unit that performs a process for traveling safety may be additionally included. Alternatively, for example, the ECU 30 of the powertrain chassis system 20 may be divided into an ECU of a powertrain system, an ECU of a steering system, and other ECUs.

For example, the process of S12 may be removed when the process of S10 in FIG. 2 is a process of acquiring one vehicle data group. Similarly, the process of 512a may be removed when the process of 510a in FIG. 12 is a process of acquiring one vehicle data group and one house data group.

For example, as illustrated in FIG. 8, when the ECU 100 in the center outside the vehicle 10 or the house 90 generates the prediction data, the ECU 100 may use data that associates the house 90 with the vehicle 10 of the user of the house 90. When, for example, data that is related to the position of the vehicle 10 is used, a correlation between the vehicle 10 and the house 90 related to the same user can be acquired based on position data including a position where the vehicle 10 is parked at night or the like, even when the center handles data of a plurality of the vehicles 10 or a plurality of the houses 90 and does not have information that specifies the vehicle 10 and the house 90 related to the same user.

The fixed node list or the fixed link list may have the number of observations of nodes or links. In such a case, information related to the number of occurrences or the like of the fixed node can be acquired.

What is claimed is:

1. A vehicle control device comprising a prediction data generation device that generates prediction data in which a node of a directed graph is defined based on data groups acquired at a same time among data groups, each of which includes a plurality of types of data including data related to a device in a vehicle, and in which a link of the directed graph is defined by a transition of the node, the prediction data being used as an input of a transition prediction process which predicts the transition of the node, the prediction data generation device comprising:

a storage device; and a processor configured to define, for each of a predetermined plurality of categories, a node per category as the node of the directed graph by a data subgroup of the data group, the data subgroup including a plurality of types of data belonging to the category, define a link per category as the link of the directed graph by a transition from one of a pair of different nodes to another, use the node per category, the link per category, and at least one of the number of observations of the node per category or the number of observations of the link per category as the prediction data, and execute a storage update process that updates the prediction data in order and stores the updated prediction data in the storage device in accordance with an update of the data group along with elapse of time, wherein the storage update process includes at least one of a process of increasing the number of observations of the node on a condition that the node per category is previously known, or a process of increasing the number of observations of the link on a condition that the link per category is previously known, wherein the processor is configured to execute the transition prediction process and a command generation process that generates a command for controlling the device in the vehicle based on prediction performed by the transition prediction process; and the transition prediction process sets a node corresponding to a current node of the vehicle as a start point node among the nodes stored in the storage device and sets a specific node from candidate nodes reached by one or a plurality of transitions defined by the link stored in the storage device as a predicted node specifying a subsequent state of the vehicle, and includes at least one of a process of selecting the candidate node having a relatively large number of observations as the predicted node preferentially over the candidate node having a relatively small number of observations or a process of selecting the candidate node having a relatively large number of observations of each link connecting the start point node and the candidate node as the predicted node preferentially over the candidate node having a relatively small number of observations of each link connecting the start point node and the candidate node.

2. The prediction data generation device according to claim 1, wherein the storage update process executed by the processor includes a data group acquisition process that acquires the data group in order, a specification process that specifies the node per category by classifying the data group acquired in order into the categories, a node registration process that stores the node specified by the specification process as a new node in the storage device on a condition that the specified node is not yet stored in the storage device, a link registration process that stores a transition to the node per category specified by the specification process as a new link in the storage device on a condition that the transition is not yet stored in the storage device, and at least one of a process of increasing the number of observations of the node on a condition that the node specified by the specification process is already stored in the storage device, or a process of increasing the number of observations of the link on a condition that a transition to the specified node from an immediately previous node is already stored in the storage device.

3. The prediction data generation device according to claim 2, wherein the data group further includes a plurality of types of data in a house.

4. The prediction data generation device according to claim 1, wherein:

the vehicle includes a first controller and a second controller; and the categories include a first category that is formed by the data subgroup handled by the first controller, and a second category that is formed by the data subgroup handled by the second controller and is different from the first category.

5. The prediction data generation device according to claim 1, wherein the storage update process is configured to define an inter-category node different from the node per category as the node of the directed graph by a combination of nodes of each of the categories, define an inter-category link different from the link per category as the link of the directed graph by a transition from one of a pair of different inter-category nodes to another, and include the inter-category node, the inter-category link, and at least one of the number of observations of the inter-category node or the number of observations of the inter-category link in the prediction data that is stored in the storage device and updated in order.

6. The vehicle control device according to claim 1, wherein the storage device stores, in advance, association information that sets a predetermined node of the directed graph as a fixed node regardless of the storage update process and associates a predetermined process of controlling a predetermined device of the vehicle with the fixed node, and the processor is configured to execute a fixed command process that executes the predetermined process based on the association information without using the transition prediction process, on a condition that the current node corresponds to the fixed node.

7. The vehicle control device according to claim 6, wherein the processor is configured to execute, before executing the fixed command process, an inquiry process that makes an inquiry to a user as to whether to execute the fixed command process, and is configured to execute the fixed command process when the user permits execution of the fixed command process in response to the inquiry.

* * * * *